US011394993B2

(12) United States Patent
Li et al.

(10) Patent No.: US 11,394,993 B2
(45) Date of Patent: Jul. 19, 2022

(54) METHOD AND APPARATUS FOR AFFINE INTER PREDICTION WITH SMALL SUBBLOCKS

(71) Applicant: Tencent America LLC, Palo Alto, CA (US)

(72) Inventors: Guichun Li, Milpitas, CA (US); Xiang Li, Saratoga, CA (US); Xiaozhong Xu, State College, PA (US); Shan Liu, San Jose, CA (US)

(73) Assignee: Tencent America LLC, Palo Alto, CA (US)

(*) Notice: Subject to any disclaimer, the term of this patent is extended or adjusted under 35 U.S.C. 154(b) by 0 days.

(21) Appl. No.: 16/816,562

(22) Filed: Mar. 12, 2020

(65) Prior Publication Data
US 2020/0296411 A1 Sep. 17, 2020

Related U.S. Application Data

(60) Provisional application No. 62/818,068, filed on Mar. 13, 2019.

(51) Int. Cl.
H04N 19/52 (2014.01)
H04N 19/54 (2014.01)
(Continued)

(52) U.S. Cl.
CPC ........... H04N 19/52 (2014.11); H04N 19/139 (2014.11); H04N 19/176 (2014.11); H04N 19/44 (2014.11); H04N 19/54 (2014.11)

(58) Field of Classification Search
CPC .. H04N 19/139; H04N 19/159; H04N 19/176; H04N 19/513; H04N 19/52
See application file for complete search history.

(56) References Cited

U.S. PATENT DOCUMENTS

2013/0101024 A1\* 4/2013 Van der Auwera .. H04N 19/186
375/240.03
2018/0070102 A1 3/2018 Zhang et al.
(Continued)

FOREIGN PATENT DOCUMENTS

CN 103999465 B 11/2017
EP 3681161 A1 7/2020
(Continued)

OTHER PUBLICATIONS

International Search Report with Written Opinion dated Jun. 11, 2020 in application PCT/US2020/022686, citing references AO-AR therein (15 pages).

(Continued)

Primary Examiner — Jayanti K Patel
Assistant Examiner — Christopher Kingsbury Glover
(74) Attorney, Agent, or Firm — ArentFox Schiff LLP

(57) ABSTRACT

Aspects of the disclosure provide methods and apparatuses for video encoding/decoding. In some examples, an apparatus for video decoding includes processing circuitry. The processing circuitry is configured to decode prediction information of a block in a current picture from a coded video bitstream. The prediction information indicates an affine model in an inter prediction mode. The processing circuitry is configured to determine motion vectors of control points of the block according to the affine model. The processing circuitry is configured to determine a motion vector of a sub-block of the block from the determined motion vectors of the control points, one of a width and a height of the sub-block being less than 4. Further, the processing circuitry is configured to reconstruct at least a sample of the sub-block according to the determined motion vector.

21 Claims, 25 Drawing Sheets

(51) Int. Cl.
*H04N 19/176* (2014.01)
*H04N 19/139* (2014.01)
*H04N 19/44* (2014.01)

(56) References Cited

U.S. PATENT DOCUMENTS

| | | | | |
|---|---|---|---|---|
| 2018/0098087 A1* | 4/2018 | Li | .................. | H04N 19/159 |
| 2018/0270500 A1* | 9/2018 | Li | .................. | H04N 19/54 |
| 2019/0335170 A1* | 10/2019 | Lee | .................. | H04N 19/52 |
| 2020/0236385 A1* | 7/2020 | Chono | .................. | H04N 19/105 |
| 2020/0280733 A1* | 9/2020 | Li | .................. | H04N 19/52 |

FOREIGN PATENT DOCUMENTS

| | | |
|---|---|---|
| EP | 3857892 A1 | 8/2021 |
| KR | 101642205 B1 | 7/2016 |
| WO | WO2018/128380 A1 | 7/2018 |
| WO | WO2020/055161 A1 | 3/2020 |

OTHER PUBLICATIONS

ITU-T Telecommnication Union, Telecommunication Standardization Sector of ITU, "High Efficiency Video Coding H.265", Series H: Audiovisual and Multimedia Systems Infrastructure of audiovisual services—Coding of moving video, Dec. 2016 (664 pages).
Benjamin Bross et al. "Versatile Video Coding (Draft 3)" Joint Video Experts Team (JVET) of ITU-T SG 16 WP3 and ISO/IEC JTC 1/SC 29/WG 11 12th Meeting: Macao, CN, Oct. 3-12, 2018. Document JVET-L1001-v9 (236 pages).
Jianle Chen et al. "Algorithm description for Versatile Video Coding and Test Model 3 (VTM 3)" Joint Video Experts Team (JVET) of ITU-T SG 16 WP 3 and ISO/IEC JTC 1/SC 29/WG 11 12th Meeting: Macao, CN, Oct. 3-12, 2018. Document: JVET-L1002-v1.
Kai Zhang et al. "Non-CE2: Interweaved Prediction for Affine Motion Compensation" Joint Video Experts Team (JVET) of ITU-T SG 16 WP 3 and ISO/IEC JTC 1/SC 29/WG 11 13th Meeting: Marrakech. MA, Jan. 9-18, 2019. Document: JVET-M0268.
Kai Zhang et al. "Non-CE2: Interweaved Prediction for Affine Motion Compensation" Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M0268 v2.
Kai Zhang et al. "Non-CE2: Interweaved Prediction for Affine Motion Compensation" Joint Video Experts Team (JVET) of ITU-T SG 16 WP 3 and ISO/IEC JTC 1/SC 29/WG 11 13th Meeting: Marrakech, MA, Jan. 9-18, 2019. Document: JVET-M0268v3.
Appendix A—JVET-M0268 (8 pages).
Appendix B—JVET-M0268 Test 1 (75 pages).
Appendix C—JVET-M0268 Test 1 VPDU (75 pages).
Appendix D—JVET-M0268 Test 1 VPD luma onlyU (75 pages).
Appendix E—JVET-M0268 Test 2 (75 pages).
Benjamin Brass et al. "Versatile Video Coding (Draft 3)" Joint Video Experts Team (JVET) of ITU-T SG 16 WP and ISO/IEC JTC 1/SC 29/WG 11 12th Meeting: Macao, CN, Oct. 3-12, 2018. Document JVET-L1001-V9 (237 pages).
Supplementary European Search Report dated Apr. 21, 2022 in Application No. 20770264.8, 14 pages.
Huang H et al: "CE2-related: Affine motion compensation using 2x2 subblock", 126. MPEG Meeting; Mar. 25, 2019-Mar. 29, 2019; Geneva; (Motion Picture Expert Group or ISO/IEC JTC1/SC29/WG11), No. m46933, Mar. 13, 2019.

\* cited by examiner

| 2201 Triangle partition index | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 2202 Split direction | 0 | 1 | 1 | 0 | 0 | 1 | 1 | 1 | 0 | 0 | 0 | 0 | 1 | 0 | 0 | 0 | 0 | 1 | 1 | 1 |
| 2203 Merge index of first triangular prediction unit | 1 | 0 | 0 | 0 | 2 | 0 | 0 | 1 | 3 | 4 | 0 | 1 | 1 | 0 | 0 | 1 | 1 | 1 | 1 | 2 |
| 2204 Merge index of second triangular prediction unit | 0 | 1 | 2 | 1 | 0 | 3 | 4 | 0 | 0 | 0 | 2 | 2 | 2 | 4 | 3 | 3 | 4 | 4 | 3 | 1 |

| 2201 Triangle partition index | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|
| 2202 Split direction | 1 | 0 | 0 | 1 | 1 | 1 | 1 | 1 | 1 | 1 | 1 | 0 | 1 | 0 | 1 | 0 | 0 | 1 | 0 | 0 |
| 2203 Merge index of first triangular prediction unit | 2 | 2 | 4 | 3 | 3 | 3 | 3 | 4 | 3 | 2 | 4 | 4 | 2 | 4 | 4 | 3 | 4 | 2 | 4 | 3 |
| 2204 Merge index of second triangular prediction unit | 0 | 1 | 3 | 0 | 2 | 4 | 0 | 1 | 3 | 1 | 1 | 1 | 3 | 2 | 2 | 1 | 2 | 4 | 2 | 4 |

*FIG. 22*

METHOD AND APPARATUS FOR AFFINE INTER PREDICTION WITH SMALL SUBBLOCKS

INCORPORATION BY REFERENCE

This present application claims the benefit of priority to U.S. Provisional Application No. 62/818,068, "Affine Inter Prediction with Small Subblocks" filed on Mar. 13, 2019, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of a neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding," December 2016). Out of the many MV prediction mechanisms that H.265 offers, described herein is a technique henceforth referred to as "spatial merge."

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. In an embodiment, prediction information of a block in a current picture is decoded from a coded video bitstream. The prediction information indicates an affine model in an inter prediction mode. Motion vectors of control points of the block are determined according to the affine model. A motion vector of a sub-block of the block is determined from the determined motion vectors of the control points. One of a width and a height of the sub-block is less than 4. Further, at least a sample of the sub-block is reconstructed according to the determined motion vector.

In an embodiment, a motion vector of a 4×4 block in the block is determined from the determined motion vectors of the control points of the block, the 4×4 block including the sub-block.

In an embodiment, the determined motion vector of the 4×4 block is stored in a memory.

In an embodiment, when the sub-block is at a top-left region of a 4×4 block in the block, the determined motion vector of the sub-block is stored in a memory.

In an embodiment, when the sub-block is at a bottom-right region of a 4×4 block in the blocks, the determined motion vector of the sub-block is stored in a memory.

In an embodiment, when the sub-block includes a center sample of a 4×4 block in the block, the determined motion vector of the sub-block is stored in a memory.

In an embodiment, when the sub-block is a chroma block, the chroma block has a fixed size regardless of a size of a corresponding luma block.

In an embodiment, the inter prediction mode is uni-prediction.

In an embodiment, the motion vector of the sub-block of the block is determined from the motion vectors of the control points when the inter prediction mode is uni-prediction and a memory bandwidth of motion compensation for an 8×8 block including the sub-block is less than or equal to a threshold.

In an embodiment, an indicator is received that indicates whether a small sub-block affine mode is used for the current picture or a tile group in the current picture. Further, the decoding, the determining the motion vectors of the control points, the determining the motion vector of the sub-block, and the reconstructing are performed when the received indicator indicates that the small sub-block affine mode is used.

Aspects of the disclosure also provide a non-transitory computer-readable medium storing instructions which when executed by a computer for video decoding cause the computer to perform any one or a combination of the methods for video decoding.

BRIEF DESCRIPTION OF THE DRAWINGS

Further features, the nature, and various advantages of the disclosed subject matter will be more apparent from the following detailed description and the accompanying drawings in which:

FIG. 22 shows a lookup table used to derive a split direction and partition motion information based on a triangle partition index in accordance with an embodiment.

DETAILED DESCRIPTION OF EMBODIMENTS

I. Video Coding Encoder and Decoder

Figure 1:
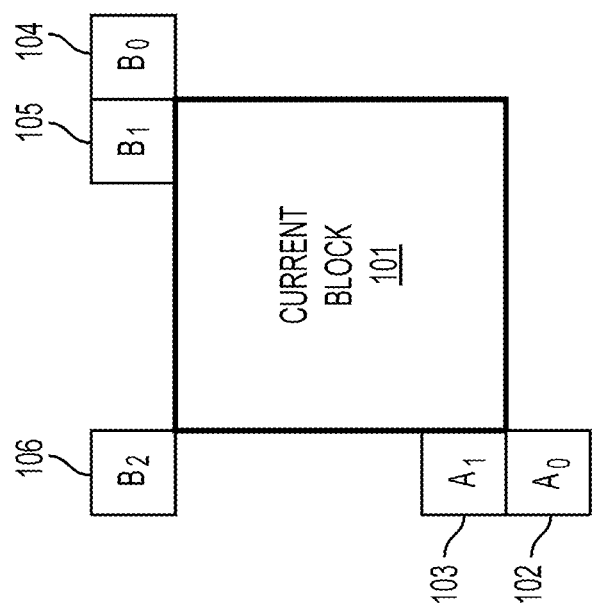
FIG. 1 is a schematic illustration of a current block and its surrounding spatial merge candidates in one example.
Figure 2:
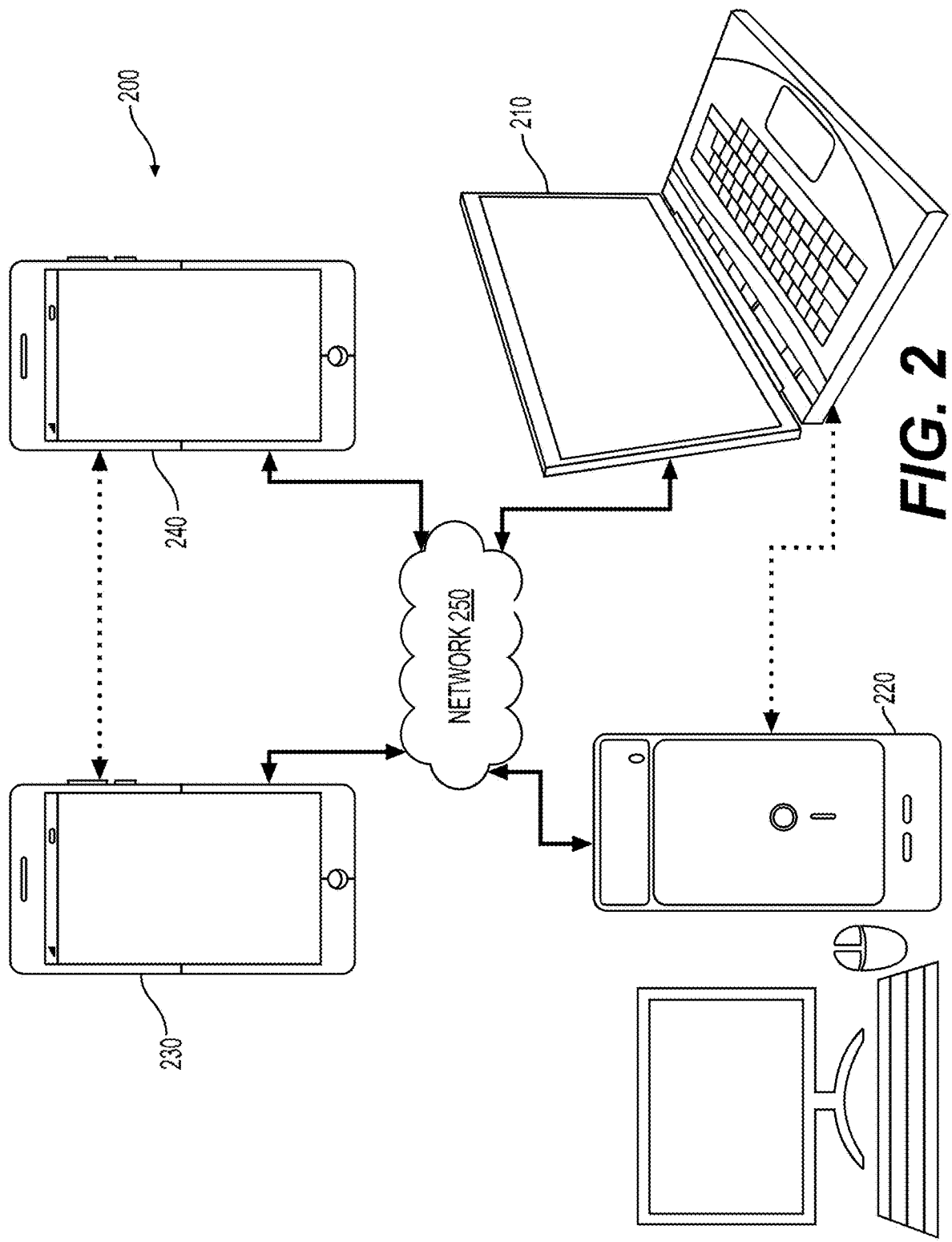
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data.

Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
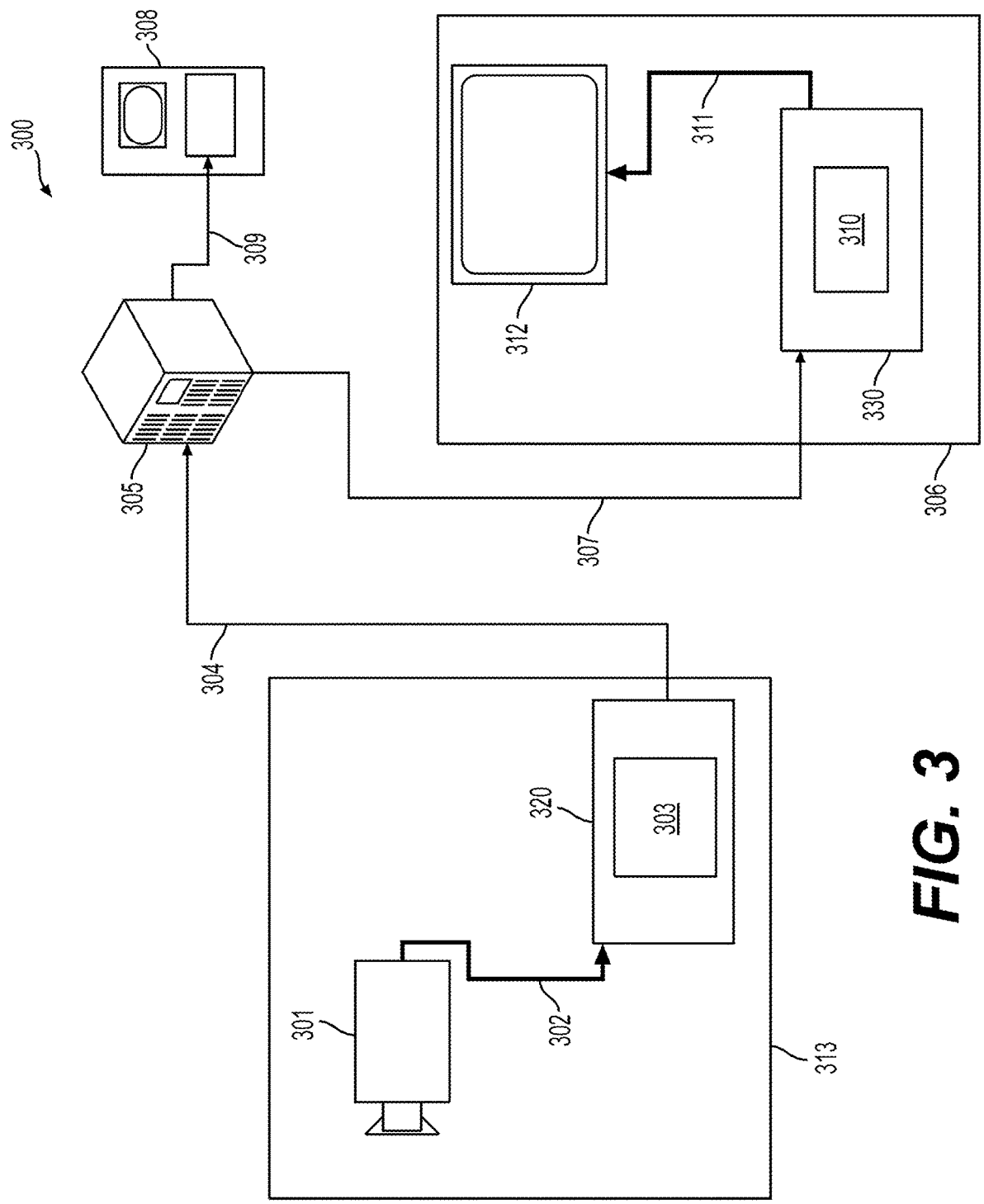
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
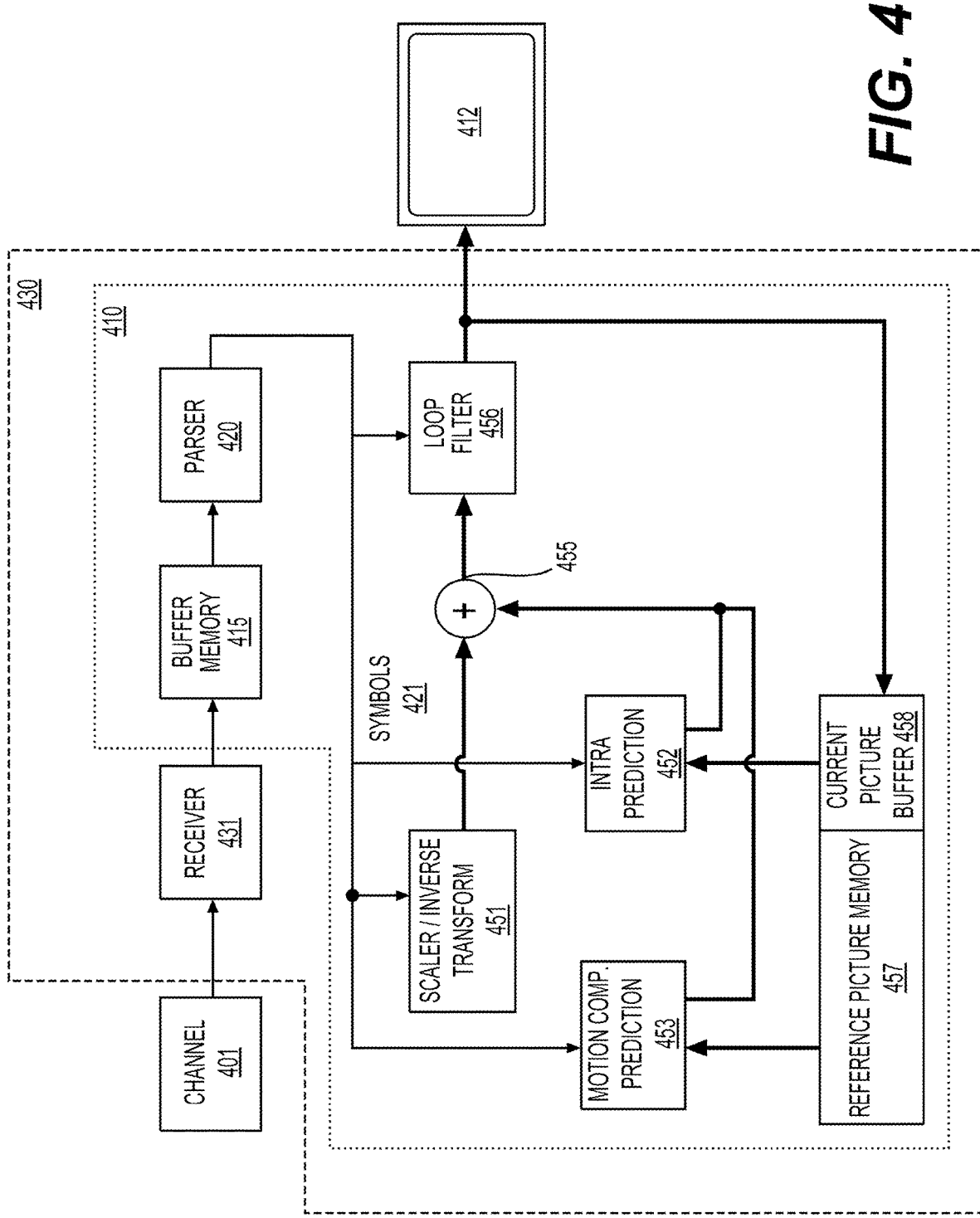
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420)

may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, which can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
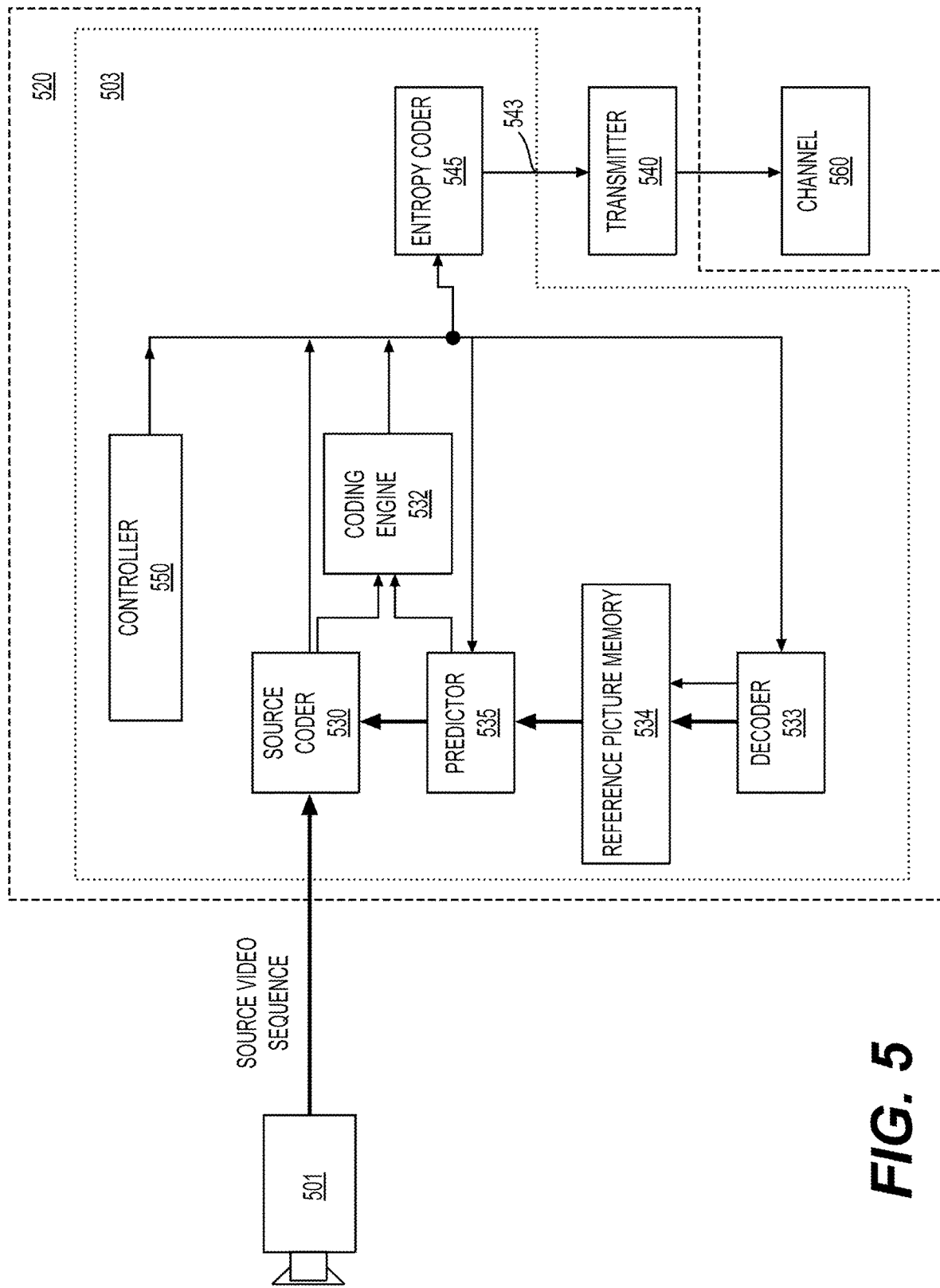
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by lossless compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
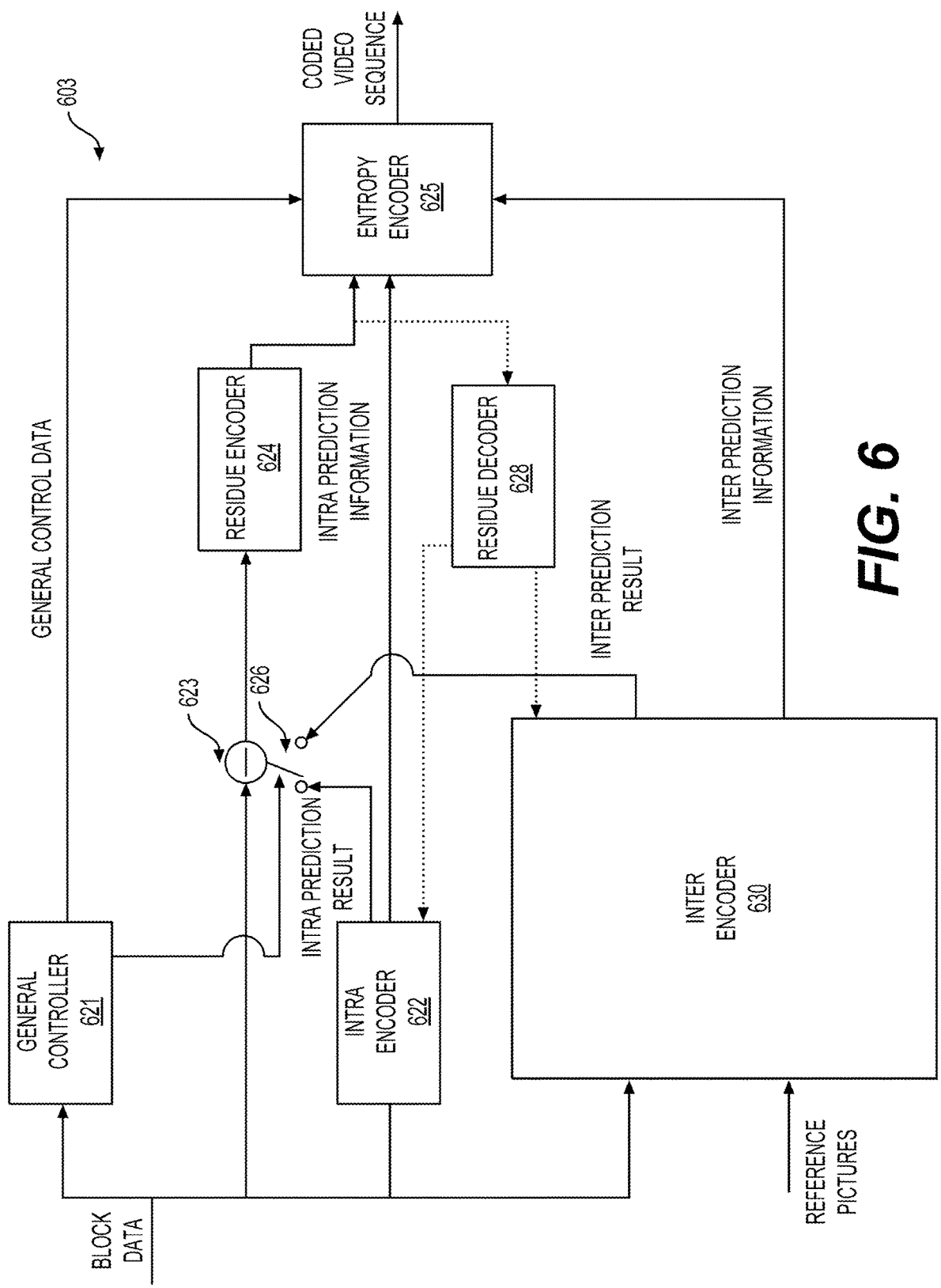
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
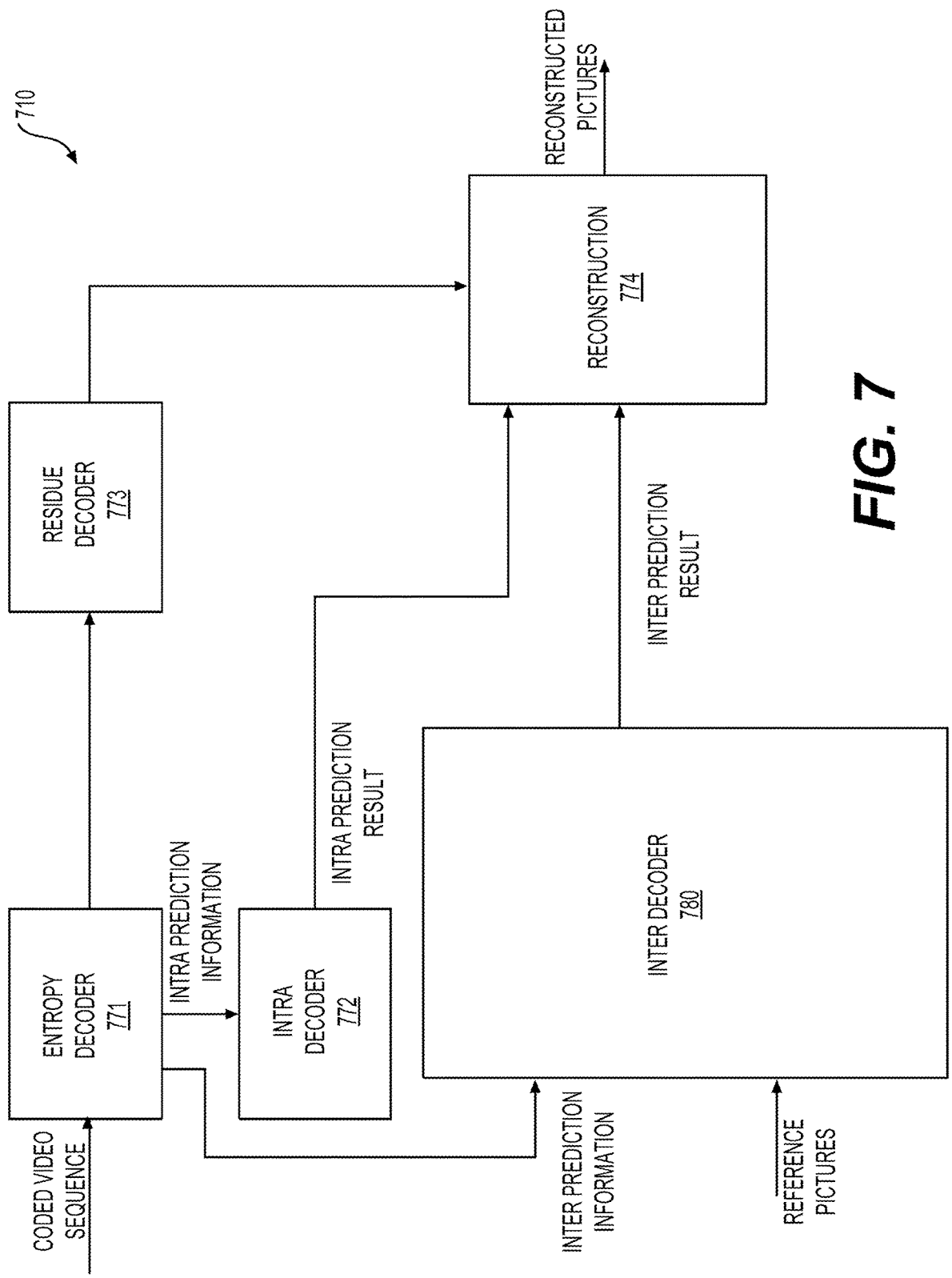
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

II. Inter Prediction Techniques

For each inter-predicted CU, motion parameters including motion vectors, reference picture indices, reference picture list usage index, and additional information needed for the new coding feature of VVC are used for inter-predicted sample generation. The motion parameters can be signaled in an explicit or implicit manner. When a CU is signaled with a skip mode, the CU is associated with one PU and has no significant residual coefficients, coded motion vector delta, or reference picture index. When a CU is coded with a merge mode, the motion parameters for the current CU are obtained from neighboring CUs, including spatial and temporal candidates, and additional schedules introduced in VVC. The merge mode can be applied to any inter-predicted CU, including the CUs coded in a skip mode. The alternative to the merge mode is the explicit transmission of motion parameters, where motion vector, corresponding reference picture index for each reference picture list, reference picture list usage flag, and other needed information are signaled explicitly for each CU.

Beyond the inter coding features in HEVC, VTM3 includes a number of refined inter prediction coding tools listed as follows:
1) Extended merge prediction;
2) Merge mode with MVD (MMVD);
3) Affine motion compensated prediction;
4) Sub-block-based temporal motion vector prediction (SbTMVP);
5) Triangle partition prediction; and
6) Combined inter and intra prediction (CIIP).

The following description of the present disclosure describes each of the inter prediction coding tools specified in VVC.

1. Extended Merge Prediction Mode

In some embodiments, the above described merge candidate list can be expanded, and an extended merge candidate list can be used in a merge mode. For example, the extended merge candidate list can be constructed by including the following five types of merge candidates sequentially subject to a maximum allowed size of merge candidates on the list:
1) Spatial motion vector predictor (MVP) from spatial neighbor coding units (CUs);
2) Temporal MVP from collocated CUs;
3) History-based MVP from a history buffer;
4) Pairwise average MVP; and
5) Zero MVs.

The term, coding unit (CU), can refer to a prediction block, or a coding block partitioned from a picture.

In various embodiments, a size of the extended merge list can be signaled in a slice header, a tile group header, and the like. In an example, a maximum allowed size of an extended merge list is 6. In some embodiments, for a CU coded in merge mode, an index of a best merge candidate may be encoded using truncated unary binarization (TU). The first bin of the merge index can be context coded, and other bins can be coded with bypass coding.

Embodiments of generation processes of different types of merge candidates on the extended merge candidate list are described below.

1.1 Spatial Candidates Derivation

Figure 8:
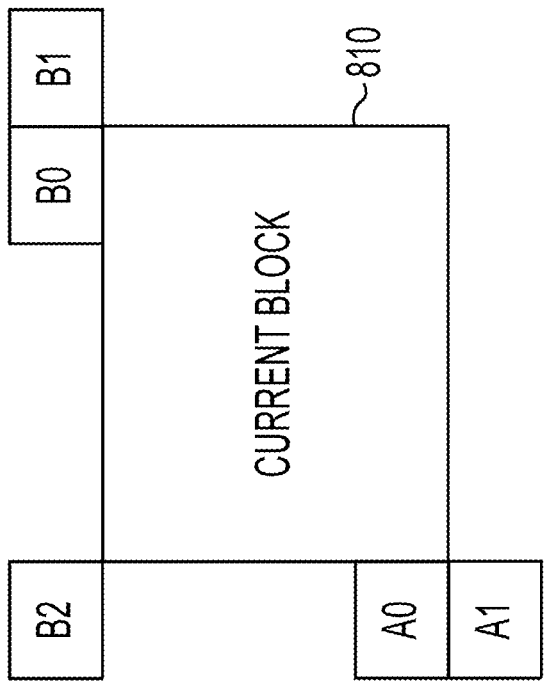
FIG. 8 is a schematic illustration of positions of spatial merge candidates in accordance with an embodiment.

In an embodiment, the derivation of spatial merge candidates in an extended merge list is similar to that of the spatial merge candidates in HEVC. FIG. 8 shows spatial merge candidate positions of a current block (810) in accordance with an embodiment. A maximum of four merge candidates can be selected and derived among the candidate positions shown in FIG. 8. The order of the derivation can be A1, B1, B0, A0 and B2 in one example. In an example, the position B2 is considered only when any CU of position A1, B1, B0, and A0 is not available or is intra coded. In an example, the CU of a position may not be available because the CU belongs to another slice or tile.

Figure 9:
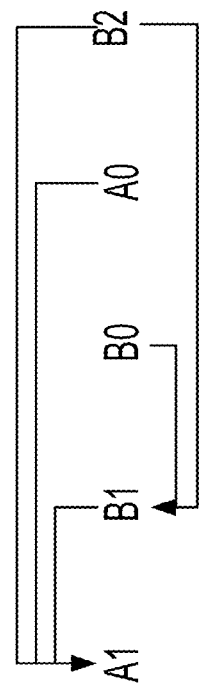
FIG. 9 shows candidate pairs in an extended merge list for a redundancy check process in accordance with an embodiment.

After a candidate at position A1 is added to the extended candidate list, the addition of the other candidates can be subject to a redundancy check. By the redundancy check, merge candidates with same motion information are excluded from the extended merge list so that a coding efficiency can be improved. To reduce computational complexity, in an example, not all possible candidate pairs are considered in the redundancy check. Instead, only pairs linked with an arrow in FIG. 9 are considered. A candidate is not added to the merge list if a counterpart indicated in FIG. 9 is in the merge list and has the same or similar motion information as the to-be-added candidate in some examples.

1.2 Temporal Candidates Derivation

Figure 10:
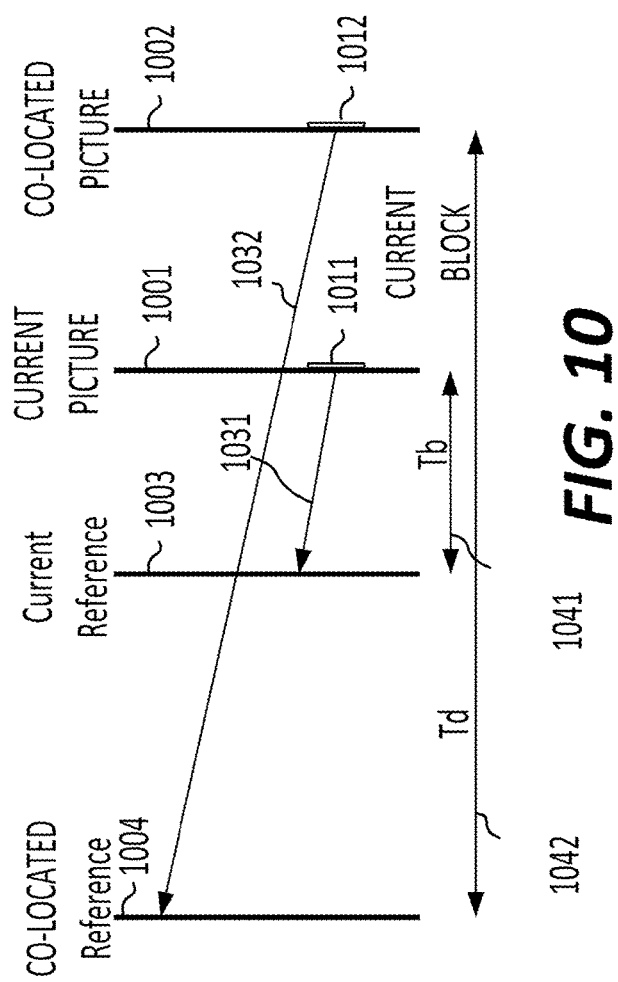
FIG. 10 shows an example of deriving a temporal merge candidate in an extended merge list in a current picture in accordance with an embodiment.

In an embodiment, only one temporal candidate is added to the extended merge list. FIG. 10 shows an example of deriving a temporal merge candidate (1031) of a current block (1011) in a current picture (1001) in accordance with an embodiment. The temporal merge candidate (1031) is derived by scaling a motion vector (1032) of a co-located block (1012) of the current block (1011) in a picture (1002) (referred to as a co-located picture). In an example, a reference picture index of the co-located picture is explicitly signaled, for example, in a slice header. In an example, a reference picture index of the temporal merge candidate (1031) is set to 0. In an embodiment, the scaling operation is performed based on distances of picture order count (POC), Tb (1041), and Td (1042). For example, Tb (1041) is defined to be a POC distance between a reference picture (1003) of the current block (1011) and the current picture (1001), while Td (1042) is defined to be a POC distance between a reference picture (1004) of the co-located block (1012) and the co-located picture (1002).

Figure 11:
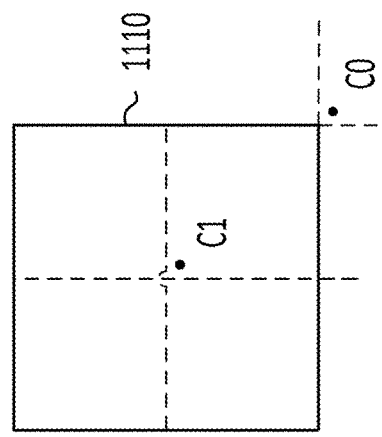
FIG. 11 shows candidate positions from which a temporal merge candidate in an extended merge list can be selected in accordance with an embodiment.

FIG. 11 shows candidate positions, C1 and C0, from which a temporal merge candidate of current block (1110) can be selected in accordance with an embodiment. In an embodiment, the position C0 is first checked to derive the temporal merge candidate. If a merge candidate at the position C0 is not available, intra coded, or is outside of the current row of CTUs, the position C1 is used.

1.3 History-Based Merge Candidates Derivation

In some embodiments, history-based motion vector prediction (HMVP) merge candidates are added to an extended merge list of a current CU after the spatial and temporal candidate MVP. In HMVP, motion information of a previously coded block can be stored in a table (or a history buffer) and used as a MVP candidate for the current CU. Such motion information is referred to as HMVP candidates. The table with multiple HMVP candidates can be maintained during an encoding or decoding process. The table can be reset (emptied) when a new CTU row is encountered in one example. Whenever there is a non-sub-block inter-coded CU, the associated motion information can be added to a last entry of the table as a new HMVP candidate in an embodiment.

In an embodiment, a size of an HMVP table, denoted by S, is set to be 6. Accordingly, up to 6 HMVP candidates may be added to the table. When inserting a new motion candidate to the table, a constrained first-in-first-out (FIFO) rule can be utilized in an embodiment. In addition, a redundancy check can be applied when adding a new HMVP candidate to find whether there is an identical HMVP in the table. If an identical HMVP in the table is found, the identical HMVP candidate may be removed from the table and all the HMVP candidates following the removed HMVP candidate are moved forward. The new HMVP candidate can then be added at the end of the table.

In an embodiment, HMVP candidates are used in an extended merge candidate list construction process. Several newly added HMVP candidates in the table can be checked in order and inserted to the extended candidate list at positions after TMVP candidate in an embodiment. A redundancy check may be applied to determine if the HMVP candidates is similar or the same as a spatial or temporal merge candidate previously added to the extended merge list.

To reduce the number of redundancy check operations, the following simplifications are introduced in an embodiment:

(i) The number of HMPV candidates used for generation of an extended merge list is set as (N<=4)?M: (8−N), wherein N indicates a number of existing candidates in the extended merge list and M indicates a number of available HMVP candidates in a history table.

(ii) Once a total number of available merge candidates in the extended merge list reaches a number of the maximally allowed merge candidates minus 1, the merge candidate list construction process from HMVP is terminated.

1.4 Pair-Wise Average Merge Candidates Derivation

In some embodiments, pairwise average candidates can be generated by averaging predefined pairs of candidates in a current merge candidate list. For example, the predefined pairs are defined as {(0, 1), (0, 2), (1, 2), (0, 3), (1, 3), (2, 3)} in an embodiment, where the numbers denote the merge indices to the merge candidate list. For example, the averaged motion vectors are calculated separately for each reference picture list. If both to-be-averaged motion vectors are available in one list, these two motion vectors may be averaged even when they point to different reference pictures. If only one motion vector is available, the available one can be used directly. If no motion vector is available, the respective pair may be skipped.

1.5 Zero Motion Vector Predictors

In some embodiments, when an extended merge list is not full after pair-wise average merge candidates are added, zero MVPs are inserted at the end of the extended merge list until a maximum allowed merge candidate number is reached.

2. Merge Mode with Motion Vector Difference (MMVD)

In addition to merge mode, where implicitly derived motion information is directly used for prediction samples generation of a current CU, merge mode with motion vector differences (MMVD) is used in some embodiments. A MMVD flag is signaled right after sending a skip flag and a merge flag to specify whether MMVD mode is used for a CU.

In an MMVD mode, after a merge candidate is selected, the merge candidate is further refined by signaled motion vector difference (MVD) information to obtain refined motion information. The MVD information includes a merge candidate flag, a distance index to specify a motion magnitude, and an index for indication of a motion direction.

Figure 12:
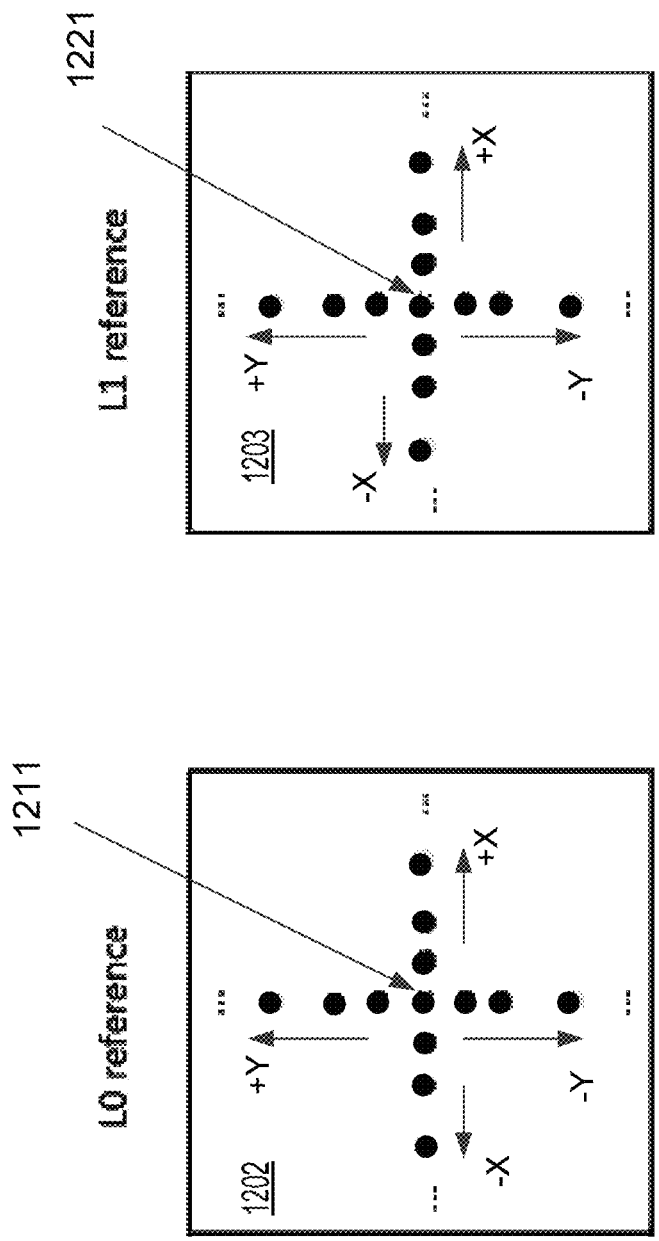
FIG. 12 shows prediction positions from which a prediction can be selected in a merge mode with motion vector difference (MMVD) in accordance with an embodiment.

One for the first two candidates in the merge list is selected to be used as a MV basis (a starting MV(s)). The merge candidate flag is signaled to specify which one is used. As shown in FIG. 12, the MV basis determines a starting point (1211) or (1221) at a reference picture (1202) or (1203) in a reference picture list, L0 or L1, respectively.

The distance index specifies motion magnitude information and indicates a predefined offset from the starting point (1211) or (1221). As shown in FIG. 12, an offset is added to either a horizontal component or vertical component of a starting MV (the MV basis) pointing to a position (1211) or (1221). The mapping relationship of a distance index and a predefined offset is specified in Table 1.

TABLE 1

| | Distance IDX | | | | | | | |
|---|---|---|---|---|---|---|---|---|
| | 0 | 1 | 2 | 3 | 4 | 5 | 6 | 7 |
| Offset (in unit of luma sample) | ¼ | ½ | 1 | 2 | 4 | 8 | 16 | 32 |

The direction index represents a direction of a MVD relative to the starting point (1211) or (1221). The direction index can represent one of the four directions as shown in Table 2.

TABLE 2

| | Direction IDX | | | |
|---|---|---|---|---|
| | 00 | 01 | 10 | 11 |
| x-axis | + | − | N/A | N/A |
| y-axis | N/A | N/A | + | − |

It is noted that the meaning of MVD sign can vary according to the information of starting MV(s). When the starting MV(s) is a uni-prediction MV or bi-prediction MVs both pointing to the same side of a current picture (i.e., POCs of two references are both larger than the POC of the current picture, or are both smaller than the POC of the current picture), the sign in Table 2 specifies the sign of MV offset added to the starting MV. When the starting MVs are bi-prediction MVs with the two MVs pointing to different sides of the current picture (i.e. the POC of one reference is larger than the POC of the current picture, and the POC of the other reference is smaller than the POC of the current picture), the sign in Table 2 specifies the sign of MV offset added to the L0 MV component of the starting MV and the sign for the L1 MV has an opposite value.

Based on the basis MV, the offset, and the MVD sign, the final MV(s) can be determined for the current CU.

3. Affine Motion Compensated Prediction

Figures 13, 14:
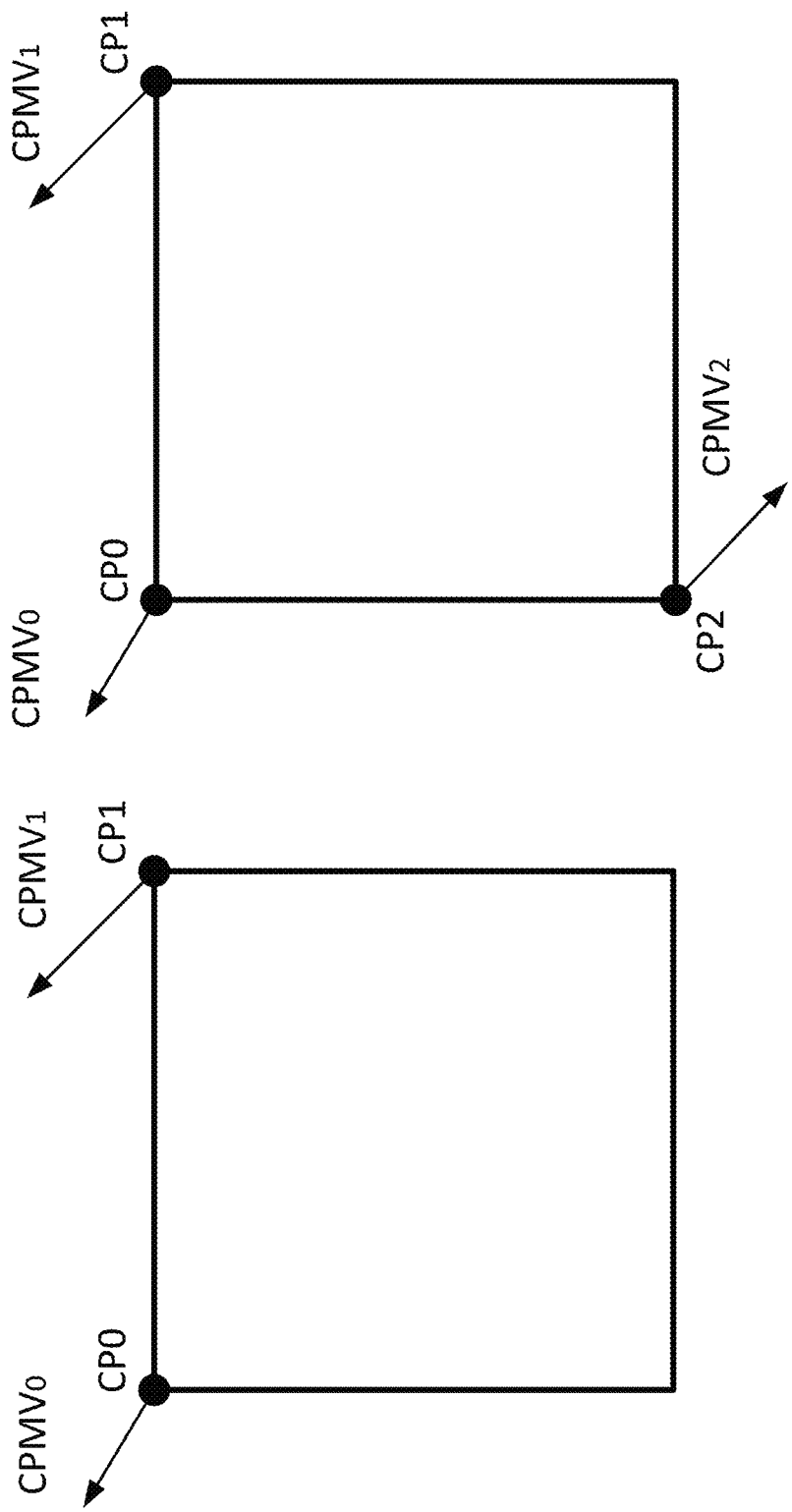
FIG. 13 shows two control point motion vectors (CPMVs) for representing a 2-parameter affine model.
FIG. 14 shows three CPMVs for representing a 3-parameter affine model.

In HEVC, only translation motion model may be applied for motion compensation prediction (MCP). While in the real world, there are many kinds of motion, including zoom in/out, rotation, perspective motions and the other irregular motions. In VTM3, a block-based affine transform motion compensation prediction is applied. As shown in FIG. 13 and FIG. 14, the affine motion field of the block can be described by two control point motion vectors (i.e., 4-parameter) or three control point motion vectors (i.e., 6-parameter).

In some examples, the current block is divided into sub-blocks. In a sub-block, a location is selected, and a motion vector for the selected location is referred to as a motion vector field (MVF) of the sub-block. In an example, a sub-block is a smallest unit for affine compensation. The MVF of the sub-block can be determined based on motion vectors at control points of the current block.

FIG. 13 shows a diagram of a current block and two control points CP0 and CP1 of the current block according to some embodiments of the disclosure. As shown in FIG. 13, CP0 is a control point located at the top-left corner of the current block, and has a motion vector MV0=(mv$_{0x}$,mv$_{0y}$), and CP1 is a control point located at the top-right corner of the current block, and has a motion vector MV1=(mv$_{1x}$, mv$_{1y}$). When the selected location for a sub-block is (x,y) ((x,y) is the relative location to the top left corner of the current block), the MVF of the sub-block is MV=(mv$_x$, mv$_y$), and can be calculated using the following formula:

$$\begin{cases} mv_x = \frac{(mv_{1x} - mv_{0x})}{W}x - \frac{(mv_{1y} - mv_{0y})}{W}y + mv_{0x} \\ mv_y = \frac{(mv_{1y} - mv_{0y})}{W}x + \frac{(mv_{1x} - mv_{0x})}{W}y + mv_{0y} \end{cases} \quad \text{(Eq. 1)}$$

where W denotes the width and height of the current block (e.g., the current block has a square shape).

FIG. 14 shows a diagram of a current block and three control points CP0, CP1, and CP2 of the current block according to some embodiments of the disclosure. As shown in FIG. 14, CP0 is a control point located at the top-left corner of the current block, and has a motion vector MV0= (mv$_{0x}$,mv$_{0y}$), CP1 is a control point located at the top-right corner of the current block, and has a motion vector MV1= (mv$_{1x}$,mv$_{1y}$), and CP2 is a control point located at the bottom-right corner of the current block, and has a motion vector MV2=(mv$_{2x}$, mv$_{2y}$). When the selected location for a sub-block is (x,y), which is a relative location to the top left corner of the current block, the MVF of the sub-block is MV=(mv$_x$, mv$_y$), and can be calculated using (Eq. 2):

$$\begin{cases} mv_x = \frac{(mv_{1x} - mv_{0x})}{W}x - \frac{(mv_{2x} - mv_{0x})}{H}y + mv_{0x} \\ mv_y = \frac{(mv_{1y} - mv_{0y})}{W}x + \frac{(mv_{2y} - mv_{0y})}{H}y + mv_{0y} \end{cases} \quad \text{(Eq. 2)}$$

where W denotes the width of the current block and H and height denotes the height of the current block.

Figure 15:
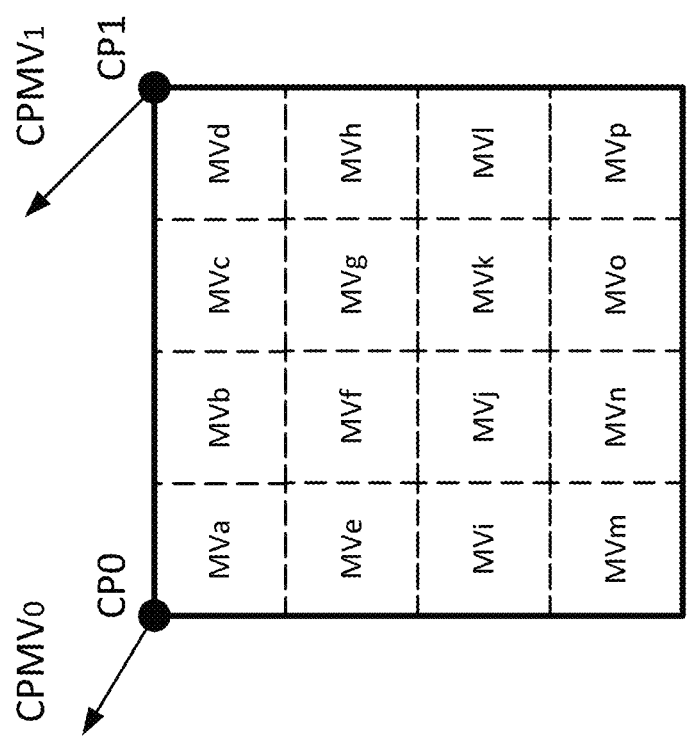
FIG. 15 shows motion vectors derived for sub-blocks partitioned from a current block coded with an affine prediction mode.

In order to simplify the motion compensation prediction, block-based affine transform prediction can be applied. To derive motion vector of each 4×4 luma sub-block, the motion vector of the center sample of each sub-block, as shown in FIG. 15, is calculated according to above equations, and rounded to 1/16 fraction accuracy. Then the motion compensation interpolation filters can be applied to generate the prediction of each sub-block with derived motion vector. The sub-block size of chroma-components can also be set to 4×4. The MV of a 4×4 chroma sub-block can be calculated as the average of the MVs of the four corresponding 4×4 luma sub-blocks.

According to an aspect of the disclosure, various techniques can be used to generate affine predictors for the current block, using either model based affine prediction from multiple neighboring affine coded blocks, or multiple control point based affine prediction from multiple neighboring MVs.

3.1 Affine Merge Prediction

According to some embodiments, an AF_MERGE mode may be applied for CUs with both width and height larger than or equal to 8. In this mode, the control point motion vectors (CPMVs) of the current CU may be generated based on motion information of spatial neighboring CUs. There may be up to five Control Point Motion Vector Predictor (CPMVP) candidates, and an index may be signalled to indicate the CPMVP to be used for the current CU.

In some embodiments, the following three types of CPMV candidate are used to form the affine merge candidate list:
  (i) inherited affine merge candidates that are extrapolated from the CPMVs of the neighbour CUs,
  (ii) constructed affine merge candidates CPMVPs that are derived using the translational MVs of the neighbour CUs, and
  (iii) zero MVs.

Figure 16:
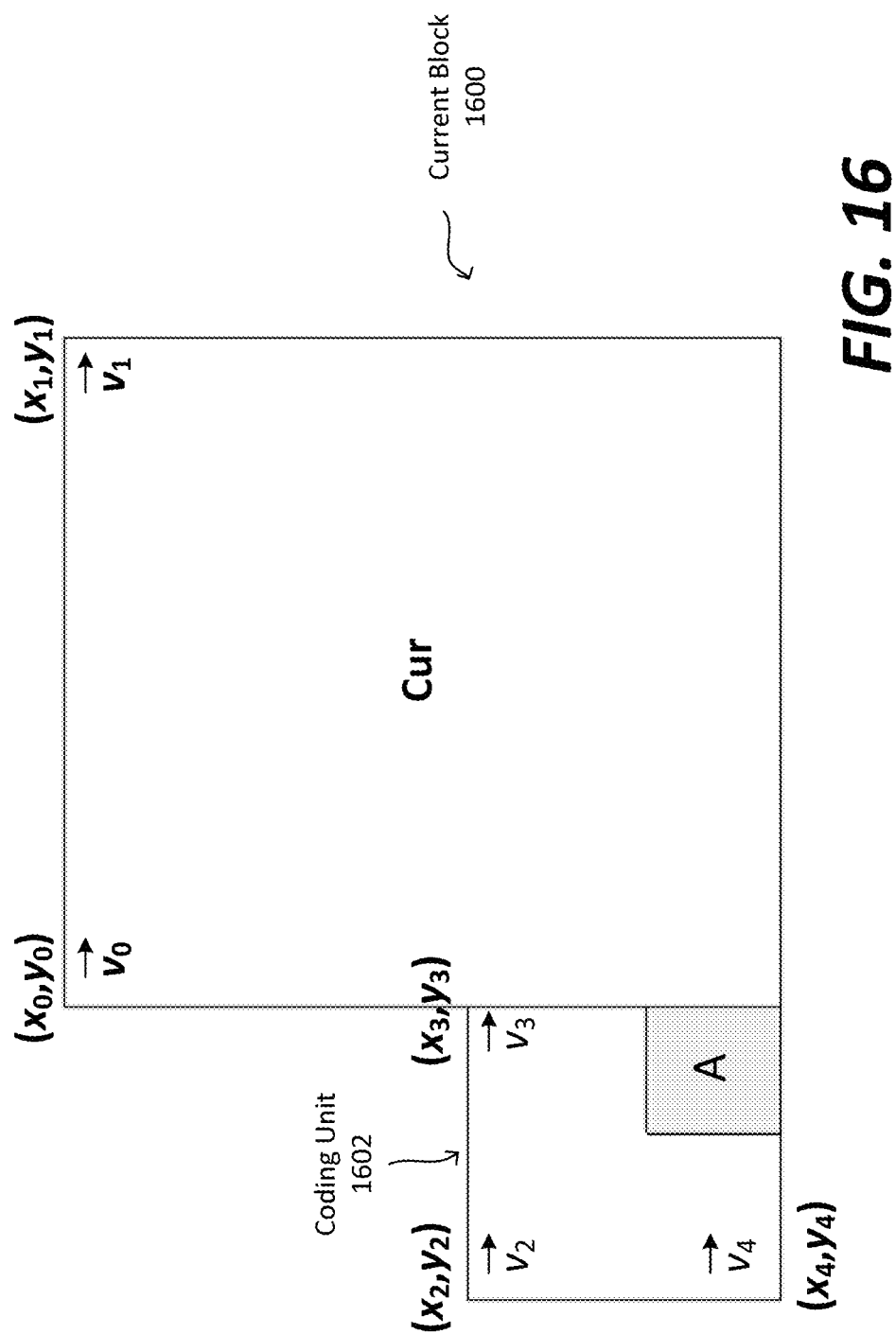
FIG. 16 shows a neighboring block of a current block for deriving an inherited affine merge candidate.

According to some embodiments, there may be a maximum of two inherited affine candidates in VTM3, which may be derived from an affine motion model of the neighboring blocks. These two inherited candidates may include one from the left neighboring CUs and one from the above neighboring CUs. As an example, the candidate blocks may be the candidate blocks illustrated in FIG. 8. For the left predictor, a scan order may be A0→A1, and for the above predictor, the scan order may be B0→B1→B2. In some embodiments, only the first inherited candidate from each side is selected, and no pruning check is performed between two inherited candidates. When a neighboring affine CU is identified, this CU's control point motion vectors may be used to derive the CPMVP candidate in the affine merge list of the current CU. As shown in FIG. 16, which illustrates a current block 1600, if a neighbour left bottom block A is coded in affine mode, the motion vectors v$_2$, v$_3$ and v$_4$ of the top left corner, above right corner and left bottom corner of the CU 1602, which contains the block A, are attained. When block A is coded with a 4-parameter affine model, the two CPMVs of the current CU may be calculated according to v$_2$ and $v_3$. If block A is coded with a 6-parameter affine model, the three CPMVs of the current CU may be calculated according to $v_2$, $v_3$ and $v_4$.

Figure 17:
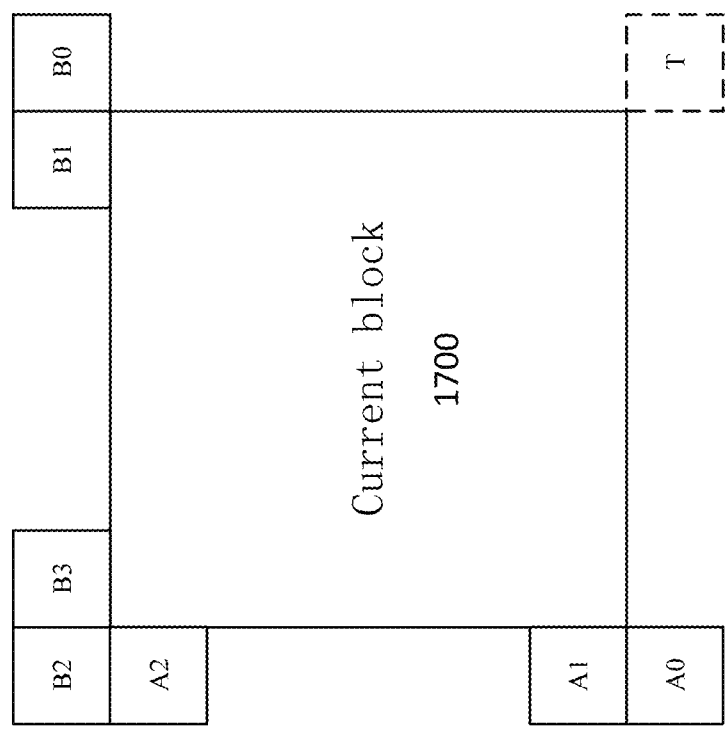
FIG. 17 shows candidate block positions for deriving constructed affine merge candidates.

According to some embodiments, a constructed affine candidate may be constructed by combining the neighbor translational motion information of each control point. The motion information for the control points may be derived from the specified spatial neighbors and temporal neighbor (i.e., "T") of current block 1700, as shown in FIG. 17. $CPMV_k$ (k=1, 2, 3, 4) may represent the k-th control point. For $CPMV_1$, the B2→B3→A2 blocks may be checked, and the MV of the first available block may be used. For $CPMV_2$, the B1→B0 blocks may be checked, and for $CPMV_3$, the A1→A0 blocks may be checked. TMVP may be used as $CPMV_4$ if TMVP is available.

In some embodiments, after MVs of four control points are attained, affine merge candidates may be constructed based on the motion information for these control points. The following example combinations of control point MVs may be used to construct a block: $\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, and $\{CPMV_1, CPMV_3\}$ A combination of three CPMVs constructs a 6-parameter affine merge candidate, and the combination of two CPMVs constructs a 4-parameter affine merge candidate. In some embodiments, to avoid a motion scaling process, if the reference indices of control points are different, the related combination of control point MVs is discarded.

After inherited affine merge candidates and constructed affine merge candidate are checked, if the list is still not full, zero MVs may be inserted to the end of the list.

3.2 Affine AMVP Prediction

In some embodiments, affine AMVP mode can be applied for CUs with both width and height larger than or equal to 16. An affine flag at a CU level is signaled in the bitstream to indicate whether the affine AMVP mode is used and then another flag is signaled to indicate whether 4-parameter affine or 6-parameter affine is used. A difference of the CPMVs of current CU and their predictors is signaled in the bitstream. An affine AVMP candidate list size may be 2, and may be generated by using the following four types of CPVM candidate in order:
  (i) Inherited affine AMVP candidates that are extrapolated from the CPMVs of the neighbor CUs;
  (ii) Constructed affine AMVP candidates that are derived using the translational MVs of the neighbor CUs;
  (iii) Translational MVs from neighboring CUs; and
  (iv) Zero MVs.

The checking order of inherited affine AMVP candidates is similar to the checking order of inherited affine merge candidates in an example. The difference is that, for an AVMP candidate, the affine CU that has the same reference picture as in the current block is considered. In some embodiments, no pruning process is applied when inserting an inherited affine motion predictor into the candidate list.

Constructed AMVP candidate is derived from the specified spatial neighbors shown in FIG. 17. A same checking order is used as done in affine merge candidate construction. In addition, a reference picture index of a neighboring block is also checked. The first block in the checking order that is inter coded and has the same reference picture as in current CUs is used. When the current CU is coded with a 4-parameter affine model, and CPMV0 and CPMV1 are both available, the available CPMVs are added as one candidate in the affine AMVP list. When the current CU is coded with 6-parameter affine mode, and all three CPMVs (CPMV0, CPMV1, and CPMV2) are available, the available CPMVs are added as one candidate in the affine AMVP list. Otherwise, constructed AMVP candidates are set as unavailable.

If affine AMVP list candidates is still less than 2 after inherited affine AMVP candidates and constructed AMVP candidate are checked, translational motion vectors neighboring the control points will be added to predict all control point MVs of the current CU, when available. Finally, zero MVs are used to fill the affine AMVP list if the affine AMVP list is still not full.

4. Sub-Block-Based Temporal Motion Vector Predictor (SbTMVP)

According to some embodiments, a sub-block based temporal motion vector prediction (SbTMVP) method supported by VTM, similar to the temporal motion vector prediction (TMVP) in HEVC, can use the motion field in the collocated picture to improve motion vector prediction and merge mode for CUs in the current picture. The same collocated picture used by TMVP may be used for SbTVMP. SbTMVP differs from TMVP in the following two main aspects: (1) TMVP predicts motion at the CU level but SbTMVP predicts motion at sub-CU level; and (2) whereas TMVP fetches the temporal motion vectors from the collocated block in the collocated picture (the collocated block is the bottom-right or center block relative to the current CU), SbTMVP applies a motion shift before fetching the temporal motion information from the collocated picture, where the motion shift is obtained from the motion vector from one of the spatial neighboring blocks of the current CU.

Figure 18:
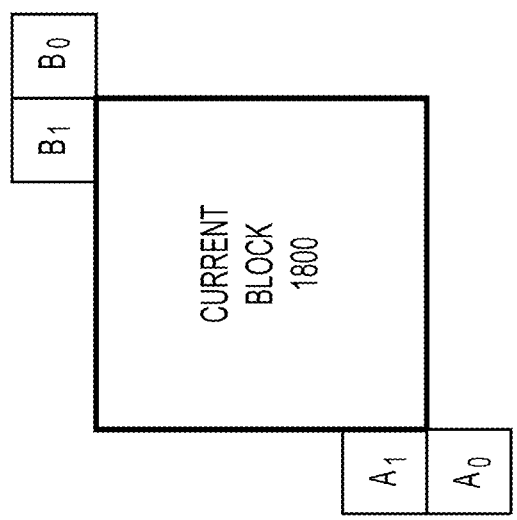
FIG. 18 is a schematic illustration of spatial neighboring blocks that can be used to determine predicting motion information for a current block using a sub-block based temporal motion vector prediction (SbTMVP) method in accordance with one embodiment.
Figure 19:
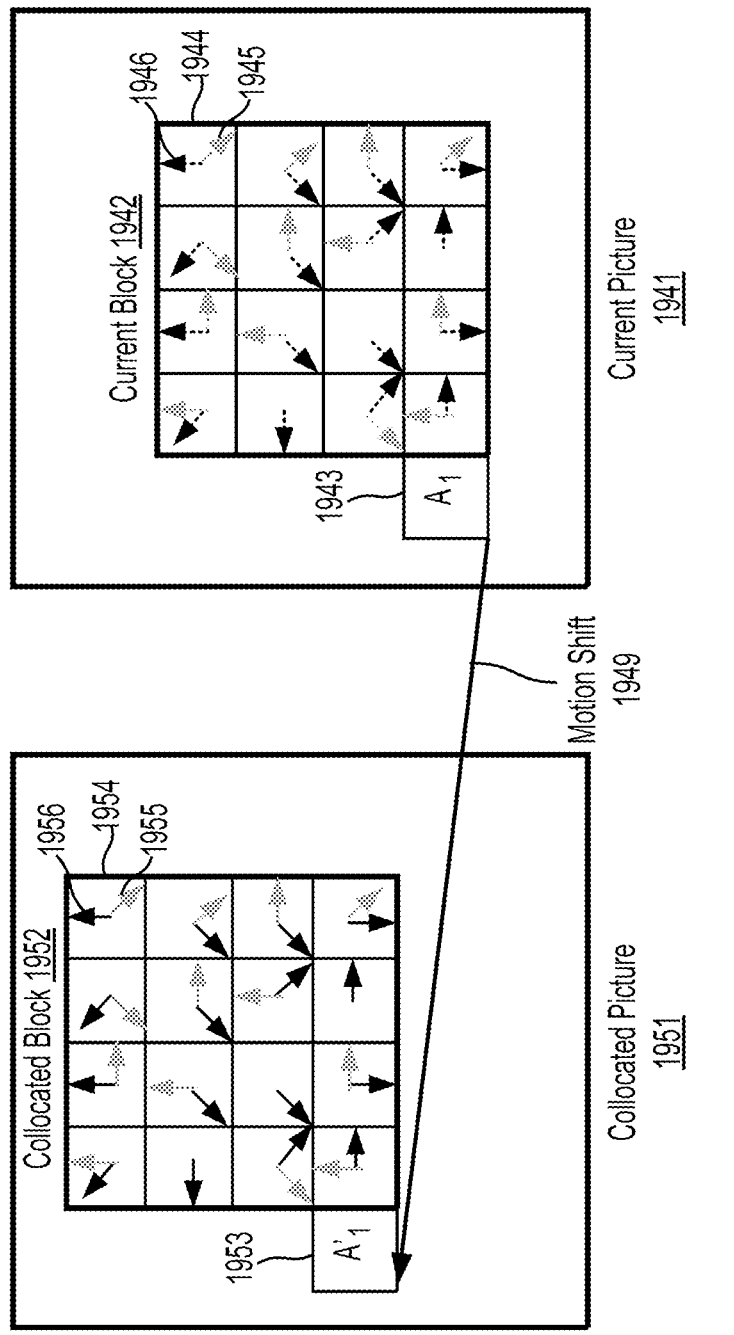
FIG. 19 is a schematic illustration of a selected spatial neighboring block for a SbTMVP method in accordance with one embodiment.

The SbTVMP process is illustrated in FIGS. 18 and 19. In some embodiments, SbTMVP predicts the motion vectors of the sub-CUs within the current CU in two steps. In the first step, as shown in FIG. 18, the spatial neighbors of a current block (1800) are examined in the order of A1, B1, B0, and A0. Once the first available spatial neighboring block that has a motion vector that uses the collocated picture as its reference picture is identified, this motion vector is selected to be the motion shift to be applied. If no such motion vector is identified from the spatial neighbors, then the motion shift is set to (0, 0).

In the second step, the motion shift identified in the first step is applied (i.e., added to the coordinates of the current block) to obtain sub-CU-level motion information (e.g., motion vectors and reference indices) from the collocated picture as shown in FIG. 19. The example in FIG. 19 assumes the motion shift (1949) is set to the motion vector of the spatial neighboring block A1 (1943). Then, for a current sub-CU (e.g., sub-CU (1944)) in the current block (1942) of the current picture (1941), the motion information of a corresponding collocated sub-CU (e.g., collocated sub-CU (1954)) in the collocated block (1952) of the collocated picture (1951) is used to derive the motion information for the current sub-CU. The motion information of the corresponding collocated sub-CU (e.g., collocated sub-CU (1954)) is converted to the motion vectors and reference indices of the current sub-CU (e.g., sub-CU (1944)) in a similar way as the TMVP process in HEVC, where temporal motion scaling is applied to align the reference pictures of the temporal motion vectors to the reference picture of the current CU.

According to some embodiments, a combined sub-block based merge list which contains both a SbTVMP candidate and affine merge candidates can be used in sub-block based merge mode. The SbTVMP mode is enabled/disabled by a sequence parameter set (SPS) flag. If the SbTMVP mode is enabled, the SbTMVP predictor is added as the first entry of the sub-block based merge list, and followed by the affine merge candidates. The maximum allowed size of the sub-block based merge list is 5 in some applications. The sub-CU size used in SbTMVP is fixed to be 8×8, for example. As done for affine merge mode, SbTMVP mode is only applicable to a CU when both width and height are larger than or equal to 8.

The encoding logic of an additional SbTMVP merge candidate is the same as the encoding logic for other merge candidates. That is, for each CU in a P or B slice, an additional rate distortion (RD) check is performed to decide whether to use the SbTMVP candidate.

5. Triangular Prediction

A triangular prediction mode (TPM) can be employed for inter prediction in some embodiments. In an embodiment, the TPM is applied to CUs that are 8×8 samples or larger in size and are coded in skip or merge mode. In an embodiment, for a CU satisfying these conditions (8×8 samples or larger in size and coded in skip or merge mode), a CU-level flag is signaled to indicate whether the TPM is applied or not.

Figure 20:
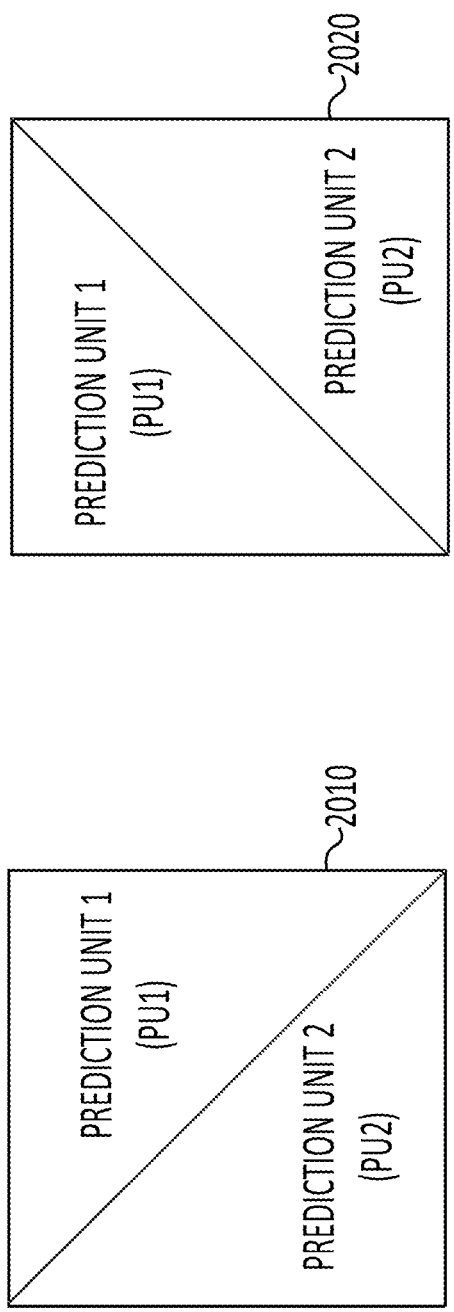
FIG. 20 shows examples of partitioning a coding unit into two triangular prediction units in accordance with an embodiment.

When the TPM is used, in some embodiments, a CU is split evenly into two triangle-shaped partitions, using either the diagonal split or the anti-diagonal split as shown in FIG. 20. In FIG. 20, a first CU (2010) is split from a top-left corner to a bottom-right corner resulting in two triangular prediction units, PU1 and PU2. A second CU (2020) is split from a top-right corner to a bottom-left corner resulting in two triangular prediction units, PU1 and PU2. Each triangular prediction unit PU1 or PU2 in the CU (2010) or (2020) is inter-predicted using its own motion information. In some embodiments, only uni-prediction is allowed for each triangular prediction unit. Accordingly, each triangular prediction unit has one motion vector and one reference picture index. The uni-prediction motion constraint can be applied to ensure that, similar to a conventional bi-prediction method, not more than two motion compensated predictions are performed for each CU. In this way, processing complexity can be reduced. The uni-prediction motion information for each triangular prediction unit can be derived from a uni-prediction merge candidate list. In some other embodiments, bi-prediction is allowed for each triangular prediction unit. Accordingly, the bi-prediction motion information for each triangular prediction unit can be derived from a bi-prediction merge candidate list.

In some embodiments, when a CU-level flag indicates that a current CU is coded using the TPM, an index, referred to as triangle partition index, is further signaled. For example, the triangle partition index can have a value in a range of [0, 39]. Using this triangle partition index, the direction of the triangle partition (diagonal or anti-diagonal), as well as the motion information for each of the partitions (e.g., merge indices (or referred to as TPM indices) to the respective uni-prediction candidate list) can be obtained through a look-up table at the decoder side. After predicting each of the triangular prediction unit based on the obtained motion information, in an embodiment, the sample values along the diagonal or anti-diagonal edge of the current CU are adjusted by performing a blending process with adaptive weights. As a result of the blending process, a prediction signal for the whole CU can be obtained. Subsequently, a transform and quantization process can be applied to the whole CU in a way similar to other prediction modes. Finally, a motion field of a CU predicted using the triangle partition mode can be created, for example, by storing motion information in a set of 4×4 units partitioned from the CU. The motion field can be used, for example, in a subsequent motion vector prediction process to construct a merge candidate list.

5.1 Uni-Prediction Candidate List Construction

Figure 21:
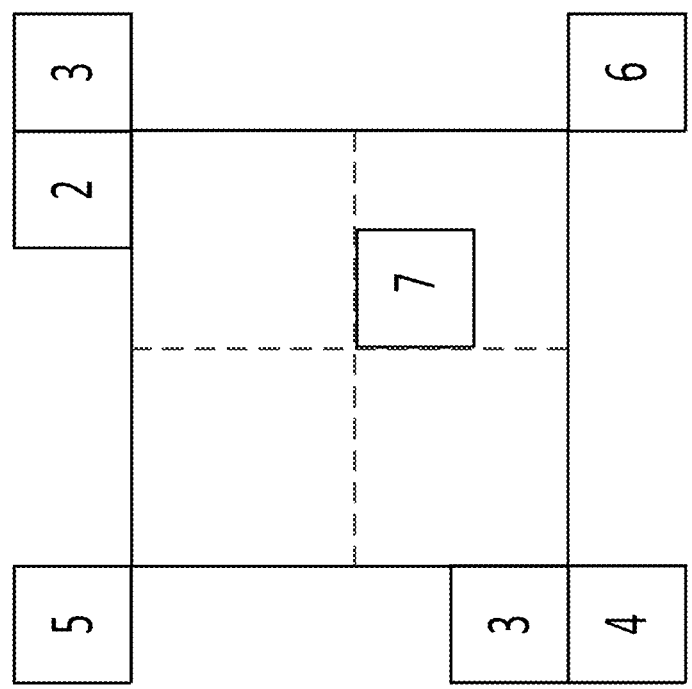
FIG. 21 shows spatial and temporal neighboring blocks used to construct a uni-prediction candidate list for a triangular prediction mode in accordance with an embodiment.

In some embodiments, a merge candidate list for prediction of two triangular prediction units of a coding block processed with a TPM can be constructed based on a set of spatial and temporal neighboring blocks of the coding block. Such a merge candidate list can be referred to as a TPM candidate list with TPM candidates listed herein. In one embodiment, the merge candidate list is a uni-prediction candidate list. The uni-prediction candidate list includes five uni-prediction motion vector candidates in an embodiment. For example, the five uni-prediction motion vector candidates are derived from seven neighboring blocks including five spatial neighboring blocks (labelled with numbers of 1 to 5 in FIG. 21) and two temporal co-located blocks (labelled with numbers of 6 to 7 in FIG. 21).

In an example, the motion vectors of the seven neighboring blocks are collected and put into the uni-prediction candidate list according to the following order: first, the motion vectors of the uni-predicted neighboring blocks; then, for the bi-predicted neighboring blocks, the L0 motion vectors (that is, the L0 motion vector part of the bi-prediction MV), the L1 motion vectors (that is, the L1 motion vector part of the bi-prediction MV), and averaged motion vectors of the L0 and L1 motion vectors of the bi-prediction MVs. In an example, if the number of candidates is less than five, zero motion vectors are added to the end of the list. In some other embodiments, the merge candidate list may include less than 5 or more than 5 uni-prediction or bi-prediction merge candidates that are selected from candidate positions that are the same or different from that shown in FIG. 14.

5.2 Lookup Table and Table Indices

In an embodiment, a CU is coded with a triangular partition mode with a TPM (or merge) candidate list including five TPM candidates. Accordingly, there are 40 possible ways to predict the CU when 5 merge candidates are used for each triangular PU. In other words, there can be 40 different combinations of split directions and merge (or TPM) indices: 2 (possible split directions)×5 (possible merge indices for a first triangular prediction unit)×5 (possible merge indices for a second triangular prediction unit)−5 (a number of possibilities when the pair of first and second prediction units shares a same merge index)). For example, when a same merge index is determined for the two triangular prediction units, the CU can be processed using a regular merge mode, instead of the triangular predication mode.

Accordingly, in an embodiment, a triangular partition index in the range of [0, 39] can be used to represent which one of the 40 combinations is used based on a lookup table. FIG. 22 shows an exemplary lookup table (2200) used to derive the split direction and merge indices based on a triangular partition index. As shown in the lookup table (2200), a first row (2201) includes the triangular partition indices ranging from 0 to 39; a second row (2202) includes possible split directions represented by 0 or 1; a third row (2203) includes possible first merge indices corresponding to a first triangular prediction unit and ranging from 0 to 4; and, a fourth row 2204 includes possible second merge indices corresponding to a second triangular prediction unit and ranging from 0 to 4.

For example, when a triangular partition index having a value of 1 is received at a decoder, based on a column (2220) of the lookup table (2200), it can be determined that the split direction is a partition direction represented by the value of 1, and the first and second merge indices are 0 and 1, respectively. As the triangle partition indices are associated with a lookup table, a triangle partition index is also referred to as a table index in this disclosure.

5.3 Blending Along the Triangular Partition Edge

In an embodiment, after predicting each triangular prediction unit using respective motion information, a blending process is applied to the two prediction signals of the two triangular prediction units to derive samples around the diagonal or anti-diagonal edge. The blending process adaptively chooses between two groups of weighting factors depending on the motion vector difference between the two triangular prediction units. In an embodiment, the two weighting factor groups are as follows:

(1) 1st weighting factor group: {7/8, 6/8, 4/8, 2/8, 1/8} for samples of a luma component and {7/8, 4/8, 1/8} for samples of chroma component; and (2) 2nd weighting factor group: {7/8, 6/8, 5/8, 4/8, 3/8, 2/8, 1/8} for samples of a luma component and {6/8, 4/8, 2/8} for samples of a chroma component.

The second weighting factor group has more luma weighting factors and blends more luma samples along the partition edge.

In an embodiment, the following condition is used to select one of the two weighting factor groups. When reference pictures of the two triangle partitions are different from each other, or when a motion vector difference between the two triangle partitions is larger than a threshold (e.g., 16 luma samples), the 2nd weighting factor group is selected. Otherwise, the 1st weighting factor group is selected.

Figure 23:
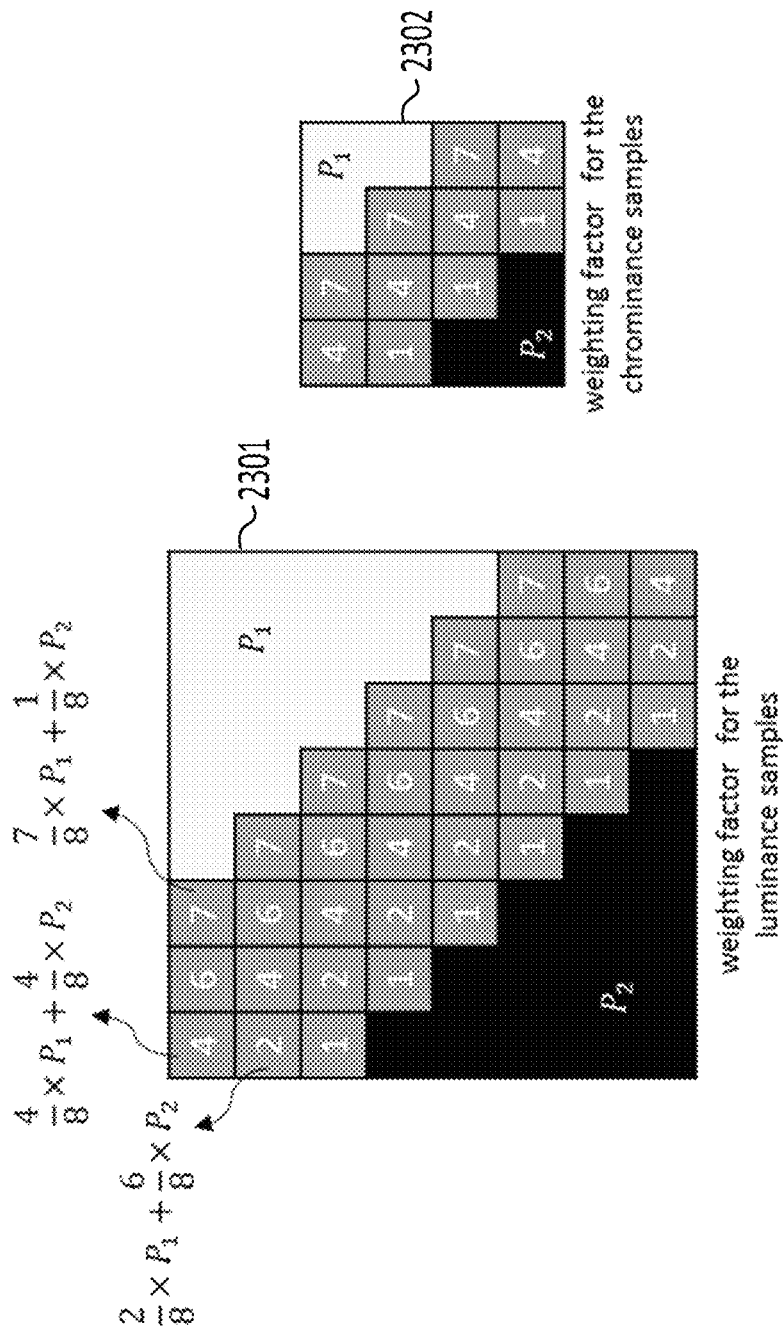
FIG. 23 shows weighting factors applied to a coding unit in an adaptive blending process in accordance with an embodiment.

FIG. 23 shows an example of a CU applying the first weighting factor group. As shown, a first coding block (2301) includes luma samples, and a second coding block (2302) includes chroma samples. A set of pixels along a diagonal edge in the coding block (2301) or (2302) are labeled with the numbers 1, 2, 4, 6, and 7 corresponding to the weighting factors 7/8, 6/8, 4/8, 2/8, and 1/8, respectively. For example, for a pixel labelled with the number of 2, a sample value of the pixel after a blending operation can be obtained according to:

the blended sample value=$2/8 \times P1 + 6/8 \times P2$, where P1 and P2 represent sample values at the respective pixel but belonging to predictions of a first triangular prediction unit and a second triangular prediction unit, respectively.

6. Combined Inter and Intra Prediction (CIIP)

In VTM3, when a CU is coded in merge mode, and if the CU contains at least 64 luma samples (i.e., the width of the CU times the height of the CU is equal to or larger than 64), an additional flag is signaled to indicate if the combined inter/intra prediction (CIIP) mode is applied to the current CU.

In order to form the CIIP prediction, an intra prediction mode is first derived from two additional syntax elements. Up to four possible intra prediction modes can be used: DC, planar, horizontal, or vertical. Then, the inter prediction and intra prediction signals may be derived using regular intra and inter decoding processes. Finally, weighted averaging of the inter and intra prediction signals may be performed to obtain the CIIP prediction.

6.1 Intra Prediction Mode Derivation

In an embodiment, up to 4 intra prediction modes, including dc, planar, horizontal, and vertical modes, can be used to predict the luma component in the CIIP mode. If the CU shape is very wide (i.e., width is more than two times of height), then the horizontal mode is not allowed. If the CU shape is very narrow (i.e., height is more than two times of width), then the vertical mode is not allowed. In these cases, only 3 intra prediction modes are allowed.

The CIIP mode uses 3 most probable modes (MPM) for intra prediction. The CIIP MPM candidate list is formed as follows:

(i) The left and top neighboring blocks are set as A and B, respectively;

(ii) The intra prediction modes of block A and block B, denoted as intraModeA and intraModeB, respectively, are derived as follows:
 a. Let X be either A or B,
 b. intraModeX is set to DC if 1) block X is not available; or 2) block X is not predicted using the CIIP mode or the intra mode; or 3) block X is outside of the current CTU, and
 c. otherwise, intraModeX is set to 1) dc or planar if the intra prediction mode of block X is dc or planar; or 2) vertical if the intra prediction mode of block X is a "vertical-like" angular mode (e.g., larger than 34), or 3) horizontal if the intra prediction mode of block X is a "horizontal-like" angular mode (e.g., smaller than or equal to 34);

(iii) If intraModeA and intraModeB are the same:
 a. If intraModeA is planar or dc, then the three MPMs are set to {planar, dc, vertical} in that order;
 b. Otherwise, the three MPMs are set to {intraModeA, planar, dc} in that order; and (iv) Otherwise (i.e., intraModeA and intraModeB are different):
 a. The first two MPMs are set to {intraModeA, intraModeB} in that order; and
 b. Uniqueness of planar, dc and vertical is checked in that order against the first two MPM candidate modes; as soon as a unique mode is found, it is added to as the third MPM.

If the CU shape is very wide or very narrow as described above, the MPM flag is inferred to be 1 without signaling. Otherwise, an MPM flag is signaled to indicate if the CIIP intra prediction mode is one of the CIIP MPM candidate modes.

If the MPM flag is 1, an MPM index is further signaled to indicate which one of the MPM candidate modes is used in CIIP intra prediction. Otherwise, if the MPM flag is 0, the intra prediction mode is set to the "missing" mode in the MPM candidate list. For example, if the planar mode is not in the MPM candidate list, then planar is the missing mode, and the intra prediction mode is set to planar. Since 4 possible intra prediction modes are allowed in CIIP, and the MPM candidate list contains only 3 intra prediction modes, one of the 4 possible modes can be the missing mode.

For the chroma components, the DM mode is applied without additional signaling. For example, chroma uses the same prediction mode as luma.

The intra prediction mode of a CIIP-coded CU will be saved and used in the intra mode coding of the future neighboring CUs.

6.2 Combining the Inter and Intra Prediction Signals

The inter prediction signal in the CIIP mode $P_{inter}$ may be derived using the same inter prediction process applied to regular merge mode; and the intra prediction signal $P_{intra}$ may be derived using the CIIP intra prediction mode following the regular intra prediction process. Then, the intra and inter prediction signals may be combined using weighted averaging, where the weight value depends on the intra prediction mode and where the sample is located in the coding block.

For example, if the intra prediction mode is the DC or planar mode, or if the block width or height is smaller than 4, then equal weights are applied to the intra prediction and the inter prediction signals.

Otherwise, the weights are determined based on the intra prediction mode (either horizontal mode or vertical mode in this case) and the sample location in the block. In the horizontal prediction mode (the weights for the vertical mode are derived similarly but in the orthogonal direction), W is the width of the block and H is the height of the block. The coding block is first split into four equal-area parts, each of the dimension (W/4)×H. Starting from the part closest to the intra prediction reference samples and ending at the part farthest away from the intra prediction reference samples, the weight wt for each of the 4 regions is set to 6, 5, 3, and 2, respectively. The final CIIP prediction signal may be derived using the following formula:

$$P_{CIIP}=((8-wt)*P_{inter}+wt*P_{intra}+4)>>3 \quad \text{(Eq. 3)}$$

7. Interweaved Affine Prediction

Figure 24:
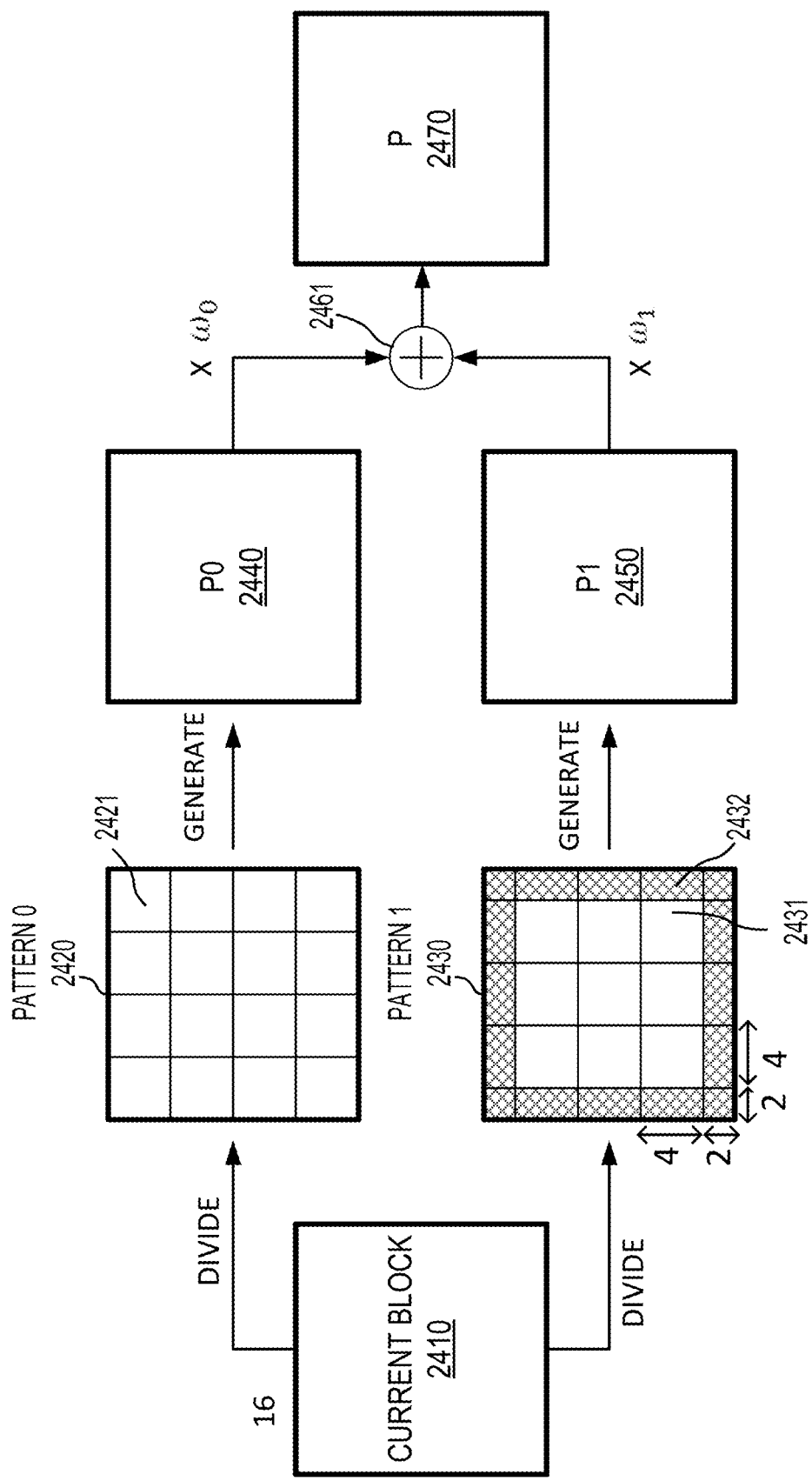
FIG. 24 shows an interweaved affine prediction process in accordance with an embodiment.

In some embodiments, interweaved affine prediction is used. For example, as shown in FIG. 24, a current block (2410) with a size of 16×16 samples is divided into sub-blocks with two different dividing patterns, Pattern 0 (2420) and Pattern 1 (2430). With regard to Pattern 0 (2420), the current block (2410) is divided into the sub-blocks (2421) with an equal size of 4×4. In contrast, Pattern 1 (2430) is shifted by a 2×2 offset with respect to Pattern 0 (2420) towards the lower-right corner of the current block (2410). With regard to Pattern 1 (2430), the current block (2410) is partitioned into the whole sub-blocks (2431) each with a size of 4×4, and the fractional sub-blocks (2432) each having a size smaller than the size of 4×4. In FIG. 24, the fractional sub-blocks (2432) form a shaded area surrounding a non-shaded area formed by the whole sub-blocks (2431).

Subsequently, two auxiliary predictions, P0 (2440) and P1 (2450), corresponding to the two dividing patterns (2420) and (2430) are generated by affine motion compensation (AMC). For example, an affine model can be determined from an affine merge candidate on a sub-block based merge candidate list. A MV for each sub-block partitioned from Pattern 0 (2420) and (2430) can be derived based on the affine model. For example, the MVs can each start from a center position of the respective sub-block.

Thereafter, a final prediction (2470) is calculated by combining the two predictions P0 (2440) and P1 (2450). For example, a weighted average operation (2461) can be performed to calculate a weighted average of two corresponding samples (denoted by $P_0$ and $P_1$) in the two predictions P0 (2440) and P1 (2450) pixel by pixel according to the following formula:

$$\begin{cases} P = (P_0 + P_1) \gg 1, \text{ if } \omega_0 = \omega_1 \\ P = (\omega_0 P_0 + \omega_1 P_1) \gg 2 \text{ Otherwise} \end{cases} \quad \text{(Eq. 4)}$$

where $\omega_0$ and $\omega_1$ are the weights corresponding to the pair of co-located samples in the two predictions P0 (2240) and P1 (2250), respectively.

Figure 25:
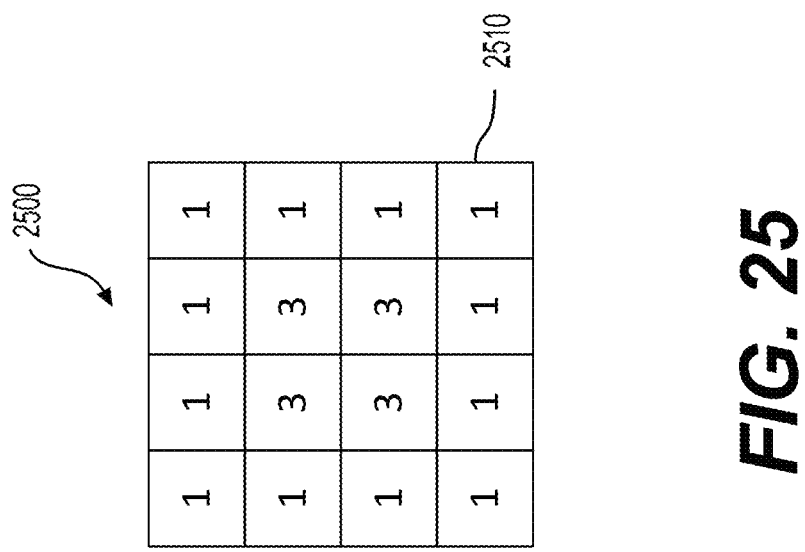
FIG. 25 shows a pattern of weights of a weighted average operation in an interweaved affine prediction process in accordance with an embodiment.

In an embodiment, the weight of each sample in the weighted average operation (2461) can be determined according to a pattern (2500) shown in FIG. 25. The pattern (2500) includes 16 samples included in a sub-block 2510 (e.g., a whole sub-block (2421) or (2431)). A prediction sample located at the center of the sub-block (2510) is associated with a weighting value of 3, while a prediction sample located at the boundary of the sub-block (2510) is associated with a weighting value 1. Depending on a position of a sample within a sub-block (2421) or (2431), a weight corresponding to the sample can be determined based on the patter (2500).

In an embodiment, to avoid tiny block motion compensation, the interweaved prediction is only applied on regions where the size of sub-blocks is 4×4 for both the two dividing patterns as shown in FIG. 24. For example, in the shaded area of Pattern 1 (2430), no interweaved prediction is applied, and in the non-shaded area of Pattern 1 (2430), the interweaved prediction is applied.

In an embodiment, an interweaved prediction may be applied on chroma components and luma component. In addition, a memory access bandwidth is not increased by interweaved prediction since an area of a reference picture used for the AMC for all sub-blocks is fetched together as a whole. Therefore, no additional reading operation is needed.

Further, for flexibility, a flag is signaled in a slice header to indicate whether interweaved prediction is used or not. In an example, the flag is always signaled to be 1. In various embodiments, interweaved affine prediction can be applied on uni-predicted affine blocks, or on both uni-predicted and bi-predicted affine blocks.

8. Inter Prediction Related Signaling in VVC

8.1 Inter Prediction Related Syntax Elements

Table 4 shows an example of the inter prediction related syntax elements at a CU level in VVC. The array indices x0, y0 specify the location (x0, y0) of a top-left luma sample of a current coding block relative to a top-left luma sample of a picture.

In Table 4, cbWidth and cbHeight denote the width and height of the luma samples of the current coding block, respectively.

TABLE 4

Inter Prediction Related Syntax Elements

```
...
}
}else if( treeType != DUAL_TREE_CHROMA ) { /* MODE_INTER */
  if( cu_skip_flag[ x0 ][ y0 ] = = 0 ) {
    merge_flag[ x0 ][ y0 ]
    if( merge_flag[ x0 ][ y0 ]) {
      merge_data( x0, y0, cbWidth, cbHeight )
    } else {
      if( slice_type = = B)
        inter_pred_idc[ x0 ][ y0 ]
      if( sps_affine_enabled_flag && cbWidth >= 16 && cbHeight >= 16 ) {
        inter_affine_flag[ x0 ][ y0 ]
        if( sps_affine_type_flag && inter_affine_flag[ x0 ][ y0 ] )
          cu_affine_type_flag[ x0 ][ y0 ]
```

TABLE 4-continued

Inter Prediction Related Syntax Elements

```
      }
    if( inter_pred_idc[ x0 ][ y0 ] != PRED_L1 ) {
      if( num_ref_idx_l0_active_minus1 > 0 )
        ref_idx_l0[ x0 ][ y0 ]
      mvd_coding( x0, y0, 0, 0 )
      if( MotionModelIdc[ x0 ][ y0 ] > 0 )
        mvd_coding( x0, y0, 0, 1 )
      if(MotionModelIdc[ x0 ][ y0 ] > 1 )
        mvd_coding( x0, y0, 0, 2 )
      mvp_l0_flag[ x0 ][ y0 ]
    }else {
      MvdL0[ x0 ][ y0 ][ 0 ] = 0
      MvdL0[ x0 ][ y0 ][ 1 ] = 0
    }
    if( inter_pred_idc[ x0 ][ y0 ] != PRED_L0 ) {
      if( num_ref_idx_l1_active_minus1 > 0)
        ref_idx_l1[ x0 ][ y0 ]
      if( mvd_l1_zero_flag && inter_pred_idc[ x0 ][ y0 ] = = PRED_BI ) {
        MvdL1[ x0 ][ y0 ][ 0 ] = 0
        MvdL1[ x0 ][ y0 ][ 1 ] = 0
        MvdCpL1[ x0 ][ y0 ][ 0 ][ 0 ] = 0
        MvdCpL1[ x0 ][ y0 ][ 0 ][ 1 ] = 0
        MvdCpL1[ x0 ][ y0 ][ 1 ][ 0 ] = 0
        MvdCpL1[ x0 ][ y0 ][ 1 ][ 1 ] = 0
        MvdCpL1[ x0 ][ y0 ][ 2 ][ 0 ] = 0
        MvdCpL1[ x0 ][ y0 ][ 2 ][ 1 ] = 0
      } else {
        mvd_coding( x0, y0, 1, 0 )
        if( MotionModelIdc[ x0 ][ y0 ] > 0 )
          mvd_coding( x0, y0, 1, 1 )
        if(MotionModelIdc[ x0 ][ y0 ] > 1)
          mvd_coding( x0, y0, 1, 2 )
      mvp_l1_flag[ x0 ][ y0 ]
    } else {
      MvdL1[ x0 ][ y0 ][ 0 ] = 0
      MvdL1[ x0 ][ y0 ][ 1 ] = 0
    }
      if( sps_amvr_enabled_flag && inter_affine_flag = = 0 &&
        ( MvdL0[ x0 ][ y0 ][ 0 ] != 0 || MvdL0[ x0 ][ y0 ][ 1 ] != 0 ||
          MvdL1[ x0 ][ y0 ][ 0 ] != 0 || MvdL1[ x0 ][ y0 ][ 1 ] != 0 ) ) {
        if( !sps_cpr_enabled_flag || !( inter_pred idc[ x0 ][ y0 ] = = PRED_L0 &&
          ref_idx_l0[ x0 ][ y0 ] = = num_ref_idx_l0_active_minus1 ) )
          amvr_flag[ x0 ][ y0 ]
        if( amvr_flag[ x0 ][ y0 ])
          amvr_4pel_flag[ x0 ][ y0 ]
      }
       if( sps_gbi_enabled_flag && inter_pred_idc[ x0 ][ y0 ] = = PRED_BI &&
         cbWidth * cbHeight >= 256 )
         gbi_idx[ x0 ][ y0 ]
    }
  }
...
```

8.2 Inter Prediction Related Semantics at a CU Level

Table 5 shows inter prediction related semantics at a CU level. Specifically, inter_pred_idc[x0][y0] specifies whether list0, list1, or bi-prediction is used for the current coding unit according to Table 5. The array indices x0, y0 in Table 4 specify the location (x0, y0) of a top-left luma sample of a current coding block relative to a top-left luma sample of a picture.

TABLE 5

Inter Prediction Related Semantics

| | Name of inter_pred_idc | |
|---|---|---|
| inter_pred_idc | ( cbWidth + cbHeight ) != 8 | ( cbWidth + cbHeight ) = = 8 |
| 0 | PRED_L0 | PRED_L0 |
| 1 | PRED_L1 | PRED_L1 |
| 2 | PRED_BI | n.a. |

When inter_pred_idc[x0][y0] is not present, it is inferred to be equal to PRED_L0.

The binarization for the syntax element inter_pred_idc is specified in Table 6 below.

TABLE 6

Binarization for inter_pred_idc

| | | Bin string | |
|---|---|---|---|
| Value of inter_pred_idc | Name of inter_pred_idc | ( cbWidth + cbHeight ) != 8 | ( cbWidth + cbHeight ) = = 8 |
| 0 | PRED_L0 | 00 | 0 |
| 1 | PRED_L1 | 01 | 1 |
| 2 | PRED_BI | 1 | — |

In Table 4, ref_idx_l0[x0][y0] specifies the list 0 reference picture index for the current coding unit. The array indices x0, y0 specify the location (x0, y0) of a top-left luma sample of a current coding block relative to a top-left luma sample of a picture. When ref_idx_l0[x0][y0] is not present, it is inferred to be equal to 0. In an embodiment, bitstream conformance may require that when the current decoded picture is a reference picture for the current coding block, inter_pred_idc[x0][y0] is equal to 0.

9. Affine Prediction with a Small Sub-Block Size

As disclosed above, affine inter prediction can be applied for each 4×4 sub-block, and each sub-block has its own MV derived from CPMVs. When a block is predicted with affine inter prediction, regular inter predictions may be applied for sub-blocks using the sub-block MVs derived from CPMVs. The coding efficiency may be further improved by using the reduced sub-block sizes. The present disclosure describes modifying the sub-block size of the affine inter prediction process of a video codec.

Figure 26:
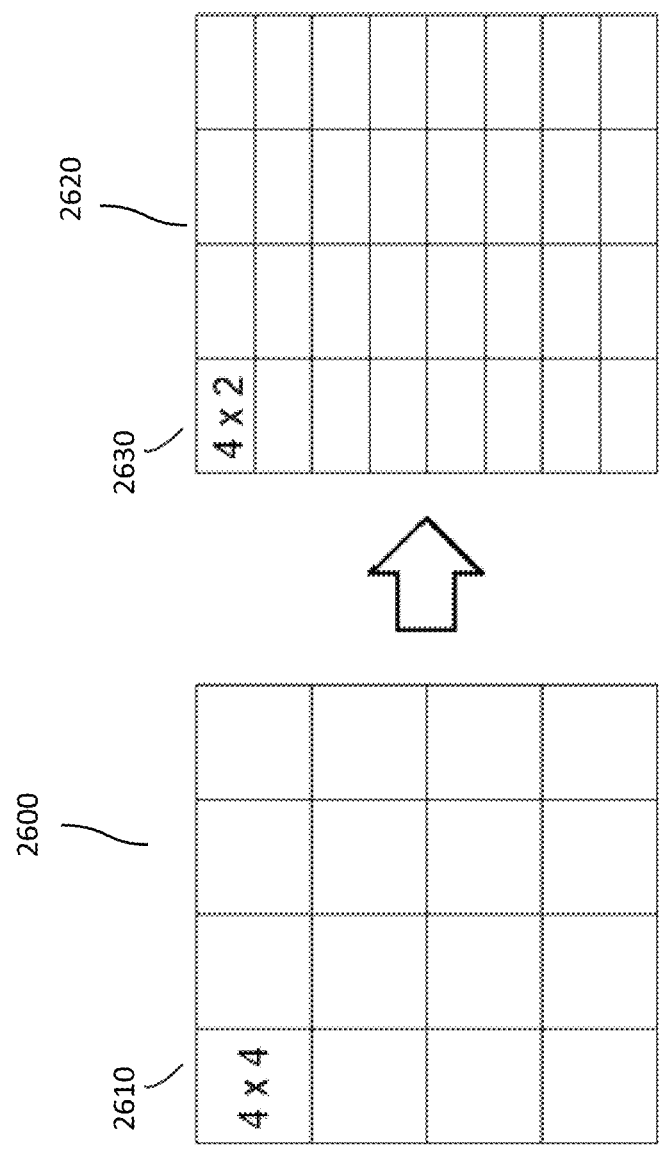
FIG. 26 shows an example of small sub-block affine inter prediction in accordance with an embodiment.

In one embodiment, the size of a sub-block in affine inter prediction is set as 4×4 samples. However, the sub-block size for motion compensation may be set to a smaller rectangle, where the width of the sub-block is larger than the height the sub-block, such as 4×2, as shown in FIG. 26. In FIG. 26, a current block (2600) is divided into sixteen 4×4 sub-blocks including the top-left sub-block (2610). Affine inter prediction can be applied for each 4×4 sub-block. In one embodiment, the sub-block size can be reduced to 4×2 samples. For example, a current block (2620) can be divided into thirty-two 4×2 sub-blocks including the top-left sub-block (2630). Affine inter prediction can be applied for each 4×2 sub-block in the current block (2620).

The small/reduced sub-block size is not limited to 4×2 samples, other sizes such as 2×4, 4×1, 1×4, 2×1, or 1×2 may also be set and used for motion compensation.

In one embodiment, when a small sub-block size such as 4×2 samples is used, sub-block motion vectors used for interpolation may be derived from CPMVs in a similar way as disclosed in Section 3 of the present disclosure. For example, motion vectors of the small sub-block (2630) used for interpolation may be derived from CPMVs of the current block (2620) using Eq. 1 or Eq. 2. Specifically, the motion vector of the center sample of each small sub-block in the current block (2620) may be derived using Eq. 1 or Eq. 2 and rounded to 1/16 fraction accuracy. The motion compensation interpolation filters may be applied to generate the prediction of each small sub-block with the derived motion vector.

In one embodiment, in order to store the sub-block motion vector for each 4×4 sub-block in the current block, the motion vector of each 4×4 sub-block in the current block may be derived and stored as the sub-block motion vector for each 4×4 sub-block. The stored motion vector of the 4×4 block may be used for the merge mode of a neighboring block. The encoder and the decoder can derive the motion vector of each small sub-block while performing motion compensation.

In one embodiment, in order to store the sub-block motion vector for each 4×4 sub-block in the current block, the motion vector of a top-left small sub-block within each 4×4 block is stored and used as the motion vector for each 4×4 block. The top-left small sub-block may refer to the small sub-block that includes a top-left sample. The stored motion vector of the 4×4 block may be used for the merge mode of a neighboring block. The encoder and the decoder can derive the motion vector of each small sub-block while performing motion compensation.

In one embodiment, in order to store the sub-block motion vector for each 4×4 sub-block in the current block, the motion vector of a bottom-right small sub-block within each 4×4 block is stored and used as the motion vector for each 4×4 block. The bottom-right small sub-block may refer to the small sub-block that includes a bottom-right sample. The stored motion vector of the 4×4 block may be used for the merge mode of a neighboring block. The encoder and the decoder can derive the motion vector of each small sub-block while performing motion compensation.

In one embodiment, in order to store the sub-block motion vector for each 4×4 sub-block in the current block, the motion vector of a small sub-block at the center of each 4×4 block is stored and used as the motion vector for each 4×4 block. In one example, the small sub-block at the center of each 4×4 block includes the sample at (2, 2) position within the 4×4 block. In another example, the small sub-block may include a sample near the (2, 2) position of the 4×4 block. The stored motion vector of the 4×4 block may be used for the merge mode of a neighboring block. The encoder and decoder can derive the motion vector of each small sub-block while performing motion compensation.

When using the small sub-block for affine mode, a chroma MV may be derived based on collocated luma block(s). In one embodiment, a chroma sub-block has a fixed sub-block size regardless of the collocated luma block size. The fixed sub-block size may be 2×2 chroma samples, or 4×4 chroma samples, or 2×4 chroma samples when 4:2:2 chroma format is used. Each chroma sub-block may have one or more collocated luma sub-blocks. When a chroma sub-block has more than one collocated luma sub-blocks, in some examples, a MV of the chroma sub-block may be derived based on an average MV of the more than one collocated luma sub-blocks. In some examples, a MV of a chroma sub-block may be derived from the MV of one collocated luma sub-block, such as the top-left luma sub-block, center luma sub-block, or bottom-right luma sub-block. In some examples, a MV of a chroma sub-block may be derived from a weighted average of a subset of the more than one collocated luma sub-blocks.

In one embodiment, the small sub-block affine inter prediction may be used only for uni-predictions. The memory bandwidth may be reduced when the small sub-block affine inter prediction is used only for uni-predictions. In an embodiment, the small sub-block affine inter prediction can be used for both uni-predictions and bi-predictions.

In one embodiment, when uni-prediction is used and the memory bandwidth of small sub-block motion compensation for an 8×8 block is less than or equal to a threshold, the small sub-block affine is enabled. Otherwise, regular 4×4 sub-block affine inter prediction is used. In one example, the threshold of an 8×8 affine block's memory bandwidth may be set to the memory bandwidth of 15×15 samples.

In one example, when the small sub-lock affine inter prediction is used, regular 8-tap interpolation filter is used for horizontal direction, and a shorter tap filter may be used for vertical direction. In one example, a 6-tap filter may be used for vertical direction. In another example, a 4-tap filter may be used for vertical direction.

In an embodiment of the present disclosure, a flag (e.g., small_subblock_affine_flag) may be signaled at a high-level (e.g., a slice, a tile, a tile-group, a picture, a sequence) to indicate whether the small sub-block affine inter prediction is used or not.

In one embodiment, an SPS flag (e.g., sps_small_subblock_affine_flag) may be signaled. If this flag is true, a picture level or a tile group level flag (e.g., picture_small_subblock_affine_flag) may be signaled to indicate whether the small sub-block size for affine inter prediction may be used for the current decoded picture or tile group.

In an embodiment, a small sub-block size for affine inter prediction flag (e.g., small_subblock_affine_flag) may be signaled at a level which is lower than a sequence level, such as a picture level, a tile group level, a tile level, a block level, etc. In such a case, the small sub-block size for affine inter prediction flag may be signaled only when an affine prediction enable flag signaled at the sequence level is true. Otherwise, when the affine prediction enable flag is signaled as false at the sequence level, the small sub-block size for the affine inter prediction flag is inferred as false.

In another embodiment, the small sub-block size for affine prediction may be enabled by other methods, such as by predefined default setting, and may not be signaled.

Figure 27:
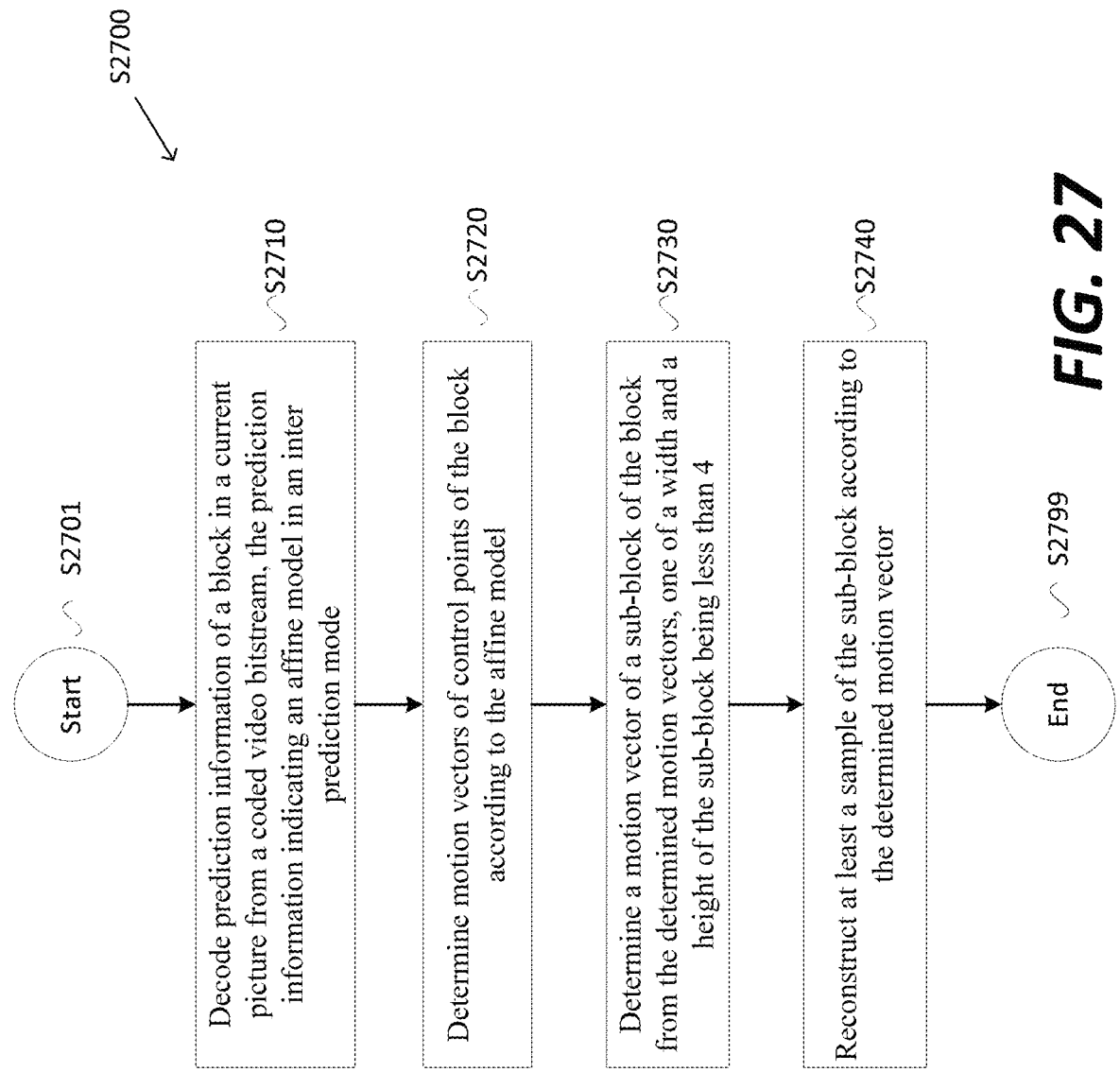
FIG. 27 is an illustration of an example decoding process in accordance with an embodiment.

FIG. 27 shows a flow chart outlining a small sub-block affine prediction process (2700) according to some embodiments of the disclosure. In various embodiments, the process (2700) can be executed by processing circuitry, such as the processing circuitry in the terminal devices (210), (220), (230) and (240), the processing circuitry that performs functions of the video decoder (310), the processing circuitry that performs functions of the video decoder (410), and the like. In some embodiments, the process (2700) is implemented in software instructions, thus when the processing circuitry executes the software instructions, the processing circuitry performs the process (2700). The process starts at (S2701) and proceeds to (S2710).

At (S2710), prediction information of a block in a current picture from a coded video bitstream is decoded. The prediction information indicates an affine model in an inter prediction mode.

At (S2720), motion vectors of control points of the block are determined according to the affine model. The affine model includes a 4-parameter model, which is described by motion vectors of two control points, and a 6-parameter model, which is described by motion vectors of three control points. The motion vectors of the control points may be determined using an affine merge mode or affine AMVP mode.

At (S2730), a motion vector of a sub-block of the block is determined from the determined motion vectors. For example, the sub-block is one of a plurality of sub-blocks of the block and a motion vector is determined for each of the plurality of sub-blocks. One of a width and a height of the sub-block is less than 4 (e.g., 4 luma samples). In an embodiment, to derive a motion vector of each sub-block partitioned from the block, a motion vector of the center sample of each sub-block may be calculated according to Eq. 1 and Eq. 2, and rounded to a $\frac{1}{16}$ fraction accuracy. A size of the sub-block may be smaller than 4×4 samples. That is, one of a width and a height of the sub-block is less than 4. For example, the size of the sub-block may be 4×2 samples.

At (S2740), at least a sample of the sub-block is reconstructed according to the determined motion vector. The process (2700) proceeds to and terminates at (S2799).

The techniques described above, can be implemented as computer software using computer-readable instructions and physically stored in one or more computer-readable media. For example, FIG. 28 shows a computer system (2800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 28:
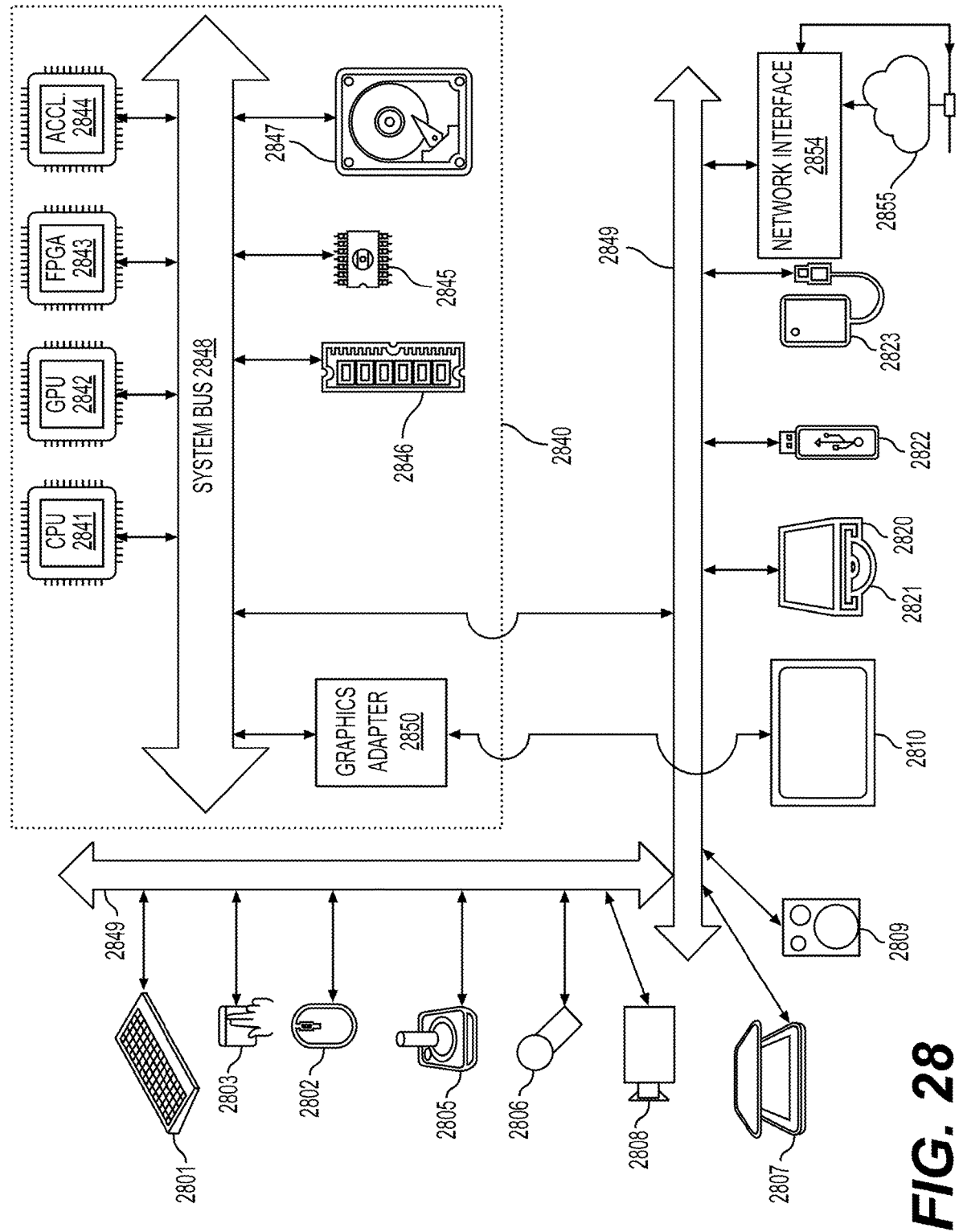
FIG. 28 is a schematic illustration of a computer system in accordance with an embodiment of the present disclosure.

The components shown in FIG. 28 for computer system (2800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2800).

Computer system (2800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2801), mouse (2802), trackpad (2803), touch screen (2810), data-glove (not shown), joystick (2805), microphone (2806), scanner (2807), camera (2808).

Computer system (2800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2810), data-glove (not shown), or joystick (2805), but there can also be tactile feedback devices that do not serve as input devices), audio output devices (such as: speakers (2809), headphones (not depicted)), visual output devices (such as screens (2810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2800) can also include human accessible storage devices and their associated media such as optical media including CD/DVD ROM/RW (2820) with CD/DVD or the like media (2821), thumb-drive (2822), removable hard drive or solid state drive (2823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2800) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2849) (such as, for example USB ports of the computer system (2800)); others are commonly integrated into the core of the computer system (2800) by attachment to a system bus as described below (for example Ethernet interface into a PC computer system or cellular network interface into a smartphone computer system). Using any of these networks, computer system (2800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2840) of the computer system (2800).

The core (2840) can include one or more Central Processing Units (CPU) (2841), Graphics Processing Units (GPU) (2842), specialized programmable processing units in the form of Field Programmable Gate Areas (FPGA) (2843), hardware accelerators for certain tasks (2844), and so forth. These devices, along with Read-only memory (ROM) (2845), Random-access memory (2846), internal mass storage such as internal non-user accessible hard drives, SSDs, and the like (2847), may be connected through a system bus (2848). In some computer systems, the system bus (2848) can be accessible in the form of one or more physical plugs to enable extensions by additional CPUs, GPU, and the like. The peripheral devices can be attached either directly to the core's system bus (2848), or through a peripheral bus (2849). Architectures for a peripheral bus include PCI, USB, and the like.

CPUs (2841), GPUs (2842), FPGAs (2843), and accelerators (2844) can execute certain instructions that, in combination, can make up the aforementioned computer code. That computer code can be stored in ROM (2845) or RAM (2846). Transitional data can also be stored in RAM (2846), whereas permanent data can be stored for example, in the internal mass storage (2847). Fast storage and retrieve to any of the memory devices can be enabled through the use of cache memory, that can be closely associated with one or more CPU (2841), GPU (2842), mass storage (2847), ROM (2845), RAM (2846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2800), and specifically the core (2840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2840) that are of non-transitory nature, such as core-internal mass storage (2847) or ROM (2845). The software implementing various embodiments of the present disclosure can be stored in such devices and executed by core (2840). A computer-readable medium can include one or more memory devices or chips, according to particular needs. The software can cause the core (2840) and specifically the processors therein (including CPU, GPU, FPGA, and the like) to execute particular processes or particular parts of particular processes described herein, including defining data structures stored in RAM (2846) and modifying such data structures according to the processes defined by the software. In addition or as an alternative, the computer system can provide functionality as a result of logic hardwired or otherwise embodied in a circuit (for example: accelerator (2844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

AMVP: Advanced MVP
ASIC: Application-Specific Integrated Circuit
BMS: benchmark set
CANBus: Controller Area Network Bus
CD: Compact Disc
CPUs: Central Processing Units
CRT: Cathode Ray Tube
CTBs: Coding Tree Blocks
CTUs: Coding Tree Units
CU: Coding Unit
DVD: Digital Video Disc
FPGA: Field Programmable Gate Areas
GOPs: Groups of Pictures
GPUs: Graphics Processing Units
GSM: Global System for Mobile communications
HEVC: High Efficiency Video Coding
HMVP: History-based MVP
HRD: Hypothetical Reference Decoder
IC: Integrated Circuit
JEM: joint exploration model
LAN: Local Area Network
LCD: Liquid-Crystal Display
LTE: Long-Term Evolution
MMVD: Merge with MVD
MV: Motion Vector
MVD: Motion vector difference
MVP: Motion vector predictor
OLED: Organic Light-Emitting Diode
PBs: Prediction Blocks
PCI: Peripheral Component Interconnect
PLD: Programmable Logic Device
PUs: Prediction Units
RAM: Random Access Memory
ROM: Read-Only Memory
SEI: Supplementary Enhancement Information
SNR: Signal Noise Ratio
SSD: solid-state drive
SbTMVP: Sub-block-based TMVP
TUs: Transform Units
TMVP: Temporal MVP
USB: Universal Serial Bus
VTM: Versatile test model
VUI: Video Usability Information
VVC: versatile video coding While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, comprising:
   decoding prediction information of a block in a current picture from a coded video bitstream, the prediction information indicating an affine model in an inter prediction mode;
   determining control point motion vectors of control points of the block according to the affine model;
   determining respective sub-block motion vectors of sub-blocks of the block based on the determined control point motion vectors of the control points and respective positions of the sub-blocks within the block, a size of the sub-blocks being based on whether a small sub-block affine mode is used, the small sub-block affine mode indicating that one of a width and a height of each of the sub-blocks is less than 4;
   reconstructing the sub-blocks according to the respective sub-block motion vectors; and
   in response to the small sub-block affine mode being used,
      determining a reference motion vector of a partition in the block, the partition being less than an entirety of the block and including two or more of the sub-blocks, and
      storing the determined reference motion vector of the partition in a memory, the reference motion vector being stored in the memory to represent motion information of an entirety of the partition and to be used for subsequent decoding of another block in the current picture.

2. The method according to claim 1, wherein
   the partition is a 4×4 block in the block, and
   the determining the reference motion vector of the partition comprises determining the reference motion vector of the block partition in the block from the determined control point motion vectors of the control points of the block.

3. The method according to claim 1, wherein the determining the reference motion vector of the partition comprises:
   determining the reference motion vector of the partition according to the determined control point motion vectors of the control points of the block and a position of the partition; or
   setting a sub-block motion vector of one of the two or more of the sub-blocks in the partition that is at a predetermined region of the partition as the reference motion vector of the partition representing the motion information of the entirety of the partition.

4. The method according to claim 1, wherein
   the partition is a 4×4 block in the block, and
   the determining the reference motion vector of the partition comprises setting a sub-block motion vector of one of the two or more of the sub-blocks in the partition that is at a top-left region of the partition as the reference motion vector of the partition representing the motion information of the entirety of the partition.

5. The method according to claim 1, wherein
   the partition is a 4×4 block in the block, and
   the determining the reference motion vector of the partition comprises setting a sub-block motion vector of one of the two or more of the sub-blocks in the partition that is at a bottom-right region of the partition as the reference motion vector of the partition representing the motion information of the entirety of the partition.

6. The method according to claim 1, wherein
   the partition is a 4×4 block in the block, and
   the determining the reference motion vector of the partition comprises setting a sub-block motion vector of one of the two or more of the sub-blocks in the partition that includes a center sample of the partition as the reference motion vector of the partition representing the motion information of the entirety of the partition.

7. The method according to claim 1, wherein
when the sub-block is a chroma block, the chroma block has a fixed size regardless of a size of a corresponding luma block.

8. The method according to claim 1, wherein
the inter prediction mode is uni-prediction.

9. The method according to claim 1, further comprising:
determining the small sub-block affine mode is used when the inter prediction mode is uni-prediction and a memory bandwidth of motion compensation for an 8×8 block including the sub-block is less than or equal to a threshold.

10. The method according to claim 1, further comprising:
receiving an indicator indicating whether the small sub-block affine mode is used for the current picture or a tile group in the current picture; and
determining whether the small sub-block affine mode is used according to the received indicator.

11. An apparatus, comprising:
processing circuitry configured to:
  decode prediction information of a block in a current picture from a coded video bitstream, the prediction information indicating an affine model in an inter prediction mode;
  determine control point motion vectors of control points of the block according to the affine model;
  determine respective sub-block motion vectors of sub-blocks of the block based on the determined control point motion vectors of the control points and respective positions of the sub-blocks within the block, a size of the sub-block being based on whether a small sub-block affine mode is used, the small sub-block affine mode indicating that one of a width and a height of each of the sub-blocks is less than 4;
  reconstruct the sub-blocks according to the respective sub-block motion vectors; and
  in response to the small sub-block affine mode being used,
    determine a reference motion vector of a partition in the block, the partition being less than an entirety of the block and including two or more of the sub-blocks, and
    store the determined reference motion vector of the partition in a memory, the reference motion vector being stored in the memory to represent motion information of an entirety of the partition and to be used for subsequent decoding of another block in the current picture.

12. The apparatus according to claim 11, wherein
the partition is a 4×4 block in the block, and
the processing circuitry is further configured to determine the reference motion vector of the partition in the block from the determined control point motion vectors of the control points of the block.

13. The apparatus according to claim 11, wherein
the partition is a 4×4 block in the block, and
the processing circuitry is further configured to set a sub-block motion vector of one of the two or more of the sub-blocks in the partition that is at a top-left region of the partition as the reference motion vector of the partition representing the motion information of the entirety of the partition.

14. The apparatus according to claim 11, wherein
the partition is a 4×4 block in the block, and
the processing circuitry is further configured to set a sub-block motion vector of one of the two or more of the sub-blocks in the partition that is at a bottom-right region of the partition as the reference motion vector of the partition representing the motion information of the entirety of the partition.

15. The apparatus according to claim 11, wherein
the partition is a 4×4 block in the block, and
the processing circuitry is further configured to set a sub-block motion vector of one of the two or more of the sub-blocks in the partition that includes a center sample of the partition as the reference motion vector of the partition representing the motion information of the entirety of the partition.

16. The apparatus according to claim 11, wherein when the sub-block is a chroma block, the chroma block has a fixed size regardless of a size of a corresponding luma block.

17. The apparatus according to claim 11, wherein the processing circuitry is further configured to
determine the small sub-block affine mode is used when the inter prediction mode is uni-prediction and a memory bandwidth of motion compensation for an 8×8 block including the sub-block is less than or equal to a threshold.

18. The apparatus according to claim 11, wherein the processing circuitry is further configured to
receive an indicator indicating whether a small sub-block affine mode is used for the current picture or a tile group in the current picture, and
determine whether the small sub-block affine mode is used according to the received indicator.

19. A non-transitory computer-readable medium storing instructions which when executed by a computer for video decoding cause the computer to perform:
  decoding prediction information of a block in a current picture from a coded video bitstream, the prediction information indicating an affine model in an inter prediction mode;
  determining control point motion vectors of control points of the block according to the affine model;
  determining respective sub-block motion vectors of sub-blocks of the block based on the determined control point motion vectors of the control points and respective positions of the sub-blocks within the block, a size of the sub-blocks being based on whether a small sub-block affine mode is used, the small sub-block affine mode indicating that one of a width and a height of each of the sub-blocks is less than 4;
  reconstructing the sub-blocks according to the respective sub-block motion vectors; and
  in response to the small sub-block affine mode being used,
    determining a reference motion vector of a partition in the block, the partition being less than an entirety of the block and including two or more of the sub-blocks, and
    storing the determined reference motion vector of the partition in a memory, the reference motion vector being stored in the memory to represent motion information of an entirety of the partition and to be used for subsequent decoding of another block in the current picture.

20. The non-transitory computer-readable medium according to claim 19, wherein
the partition is a 4×4 block in the block, and
the determining the reference motion vector of the partition comprises determining the reference motion vector of the partition in the block from the determined control point motion vectors of the control points of the block.

21. The non-transitory computer-readable medium according to claim 19, wherein the partition is a 4×4 block in the block, the determining the reference motion vector of the partition comprises setting a sub-block motion vector of one of the two or more of the sub-blocks in the partition that is at predetermined region of the partition as the reference motion vector of the partition representing the motion information of the entirety of the partition, and the predetermined region of the partition is a top-left region of the partition, a bottom-right region of the partition, or a center region of the partition including a center sample of the block partition.

\* \* \* \* \*